(12) United States Patent
Wade

(10) Patent No.: US 12,255,445 B2
(45) Date of Patent: Mar. 18, 2025

(54) RAIL-MOUNTABLE JUNCTION BOX

(71) Applicant: EASY SOLAR PRODUCTS, LLC, Holladay, UT (US)

(72) Inventor: Benjamin Wade, Holladay, UT (US)

(73) Assignee: Easy Solar Products, Inc., Sandy, UT (US)

( * ) Notice: Subject to any disclaimer, the term of this patent is extended or adjusted under 35 U.S.C. 154(b) by 70 days.

(21) Appl. No.: 18/052,404

(22) Filed: Nov. 3, 2022

(65) Prior Publication Data

US 2024/0154395 A1 May 9, 2024

(51) Int. Cl.
*H02G 3/08* (2006.01)
*H02S 40/34* (2014.01)

(52) U.S. Cl.
CPC ............. *H02G 3/081* (2013.01); *H02G 3/088* (2013.01); *H02S 40/34* (2014.12)

(58) Field of Classification Search
CPC ......... H02G 3/081; H02G 3/088; H02S 40/34
USPC .................................................. 220/3.8, 475
See application file for complete search history.

(56) References Cited

U.S. PATENT DOCUMENTS

| | | |
|---|---|---|
| 3,910,448 A | 10/1975 | Evans et al. |
| 3,927,249 A | 12/1975 | Pearse |
| 4,620,061 A | 10/1986 | Appleton |
| 4,632,269 A | 12/1986 | Rose |
| 5,228,584 A | 7/1993 | Williams, Jr. |
| 5,232,277 A | 8/1993 | Cassady |
| 5,661,264 A | 8/1997 | Reiker |
| 5,914,460 A | 6/1999 | Mowery |
| 6,023,247 A | 2/2000 | Rodeffer |
| 6,271,467 B1 | 8/2001 | Book et al. |
| 6,526,701 B2 | 3/2003 | Stearns et al. |
| 6,642,446 B2 | 11/2003 | Dodds |
| 6,727,429 B1 | 4/2004 | Koessler |
| 6,942,189 B2 | 9/2005 | Capozzi |

(Continued)

FOREIGN PATENT DOCUMENTS

| | | | |
|---|---|---|---|
| AU | 2007234520 B2 | 9/2008 | |
| CN | 103944503 A * | 7/2014 | ............ H02S 40/00 |

(Continued)

OTHER PUBLICATIONS

"EZ Solar JB-1.2", Retrieved Dec. 8, 2022 from https://ezsolarproducts.com/jb-1-2/.

(Continued)

*Primary Examiner* — J. Gregory Pickett
*Assistant Examiner* — Niki M Eloshway
(74) *Attorney, Agent, or Firm* — KW Law, LLP

(57) ABSTRACT

A junction box can include a housing with a bottom surface and sidewalls extending upward from a periphery of the bottom surface. In certain implementations, the sidewalls include a mounting sidewall to mount to a solar array rail structure. In addition, the junction box can include a lid positionable on the housing. Further, the junction box can include a mounting bracket. In some examples, the mounting bracket can include a first bracket connected to the mounting sidewall, the first bracket wall extending perpendicular to the mounting sidewall. Additionally, the mounting bracket can include a second bracket wall connected to the first bracket wall, the second bracket wall extending parallel to the mounting sidewall.

18 Claims, 12 Drawing Sheets

(56) References Cited

U.S. PATENT DOCUMENTS

| | | |
|---|---|---|
| 7,109,415 B2 | 9/2006 | Neitzel et al. |
| 7,154,040 B1 | 12/2006 | Tompkins |
| 7,179,995 B2 * | 2/2007 | Dinh .................... H02G 3/126 |
| | | 174/480 |
| 7,353,961 B2 | 4/2008 | Hull et al. |
| 7,626,118 B1 | 12/2009 | Capozzi |
| 8,479,455 B2 | 7/2013 | Schaefer et al. |
| 9,496,697 B1 | 11/2016 | Wentworth |
| 9,742,173 B2 | 8/2017 | Wentworth |
| 9,819,166 B1 | 11/2017 | Capozzi |
| 9,935,356 B2 | 4/2018 | Wentworth |
| 9,935,436 B1 | 4/2018 | Baldwin |
| 9,966,745 B2 | 5/2018 | Wentworth |
| 10,177,548 B2 | 1/2019 | Ledgerwood |
| 10,594,121 B2 | 3/2020 | Yang et al. |
| 10,707,664 B2 | 7/2020 | Segro |
| 10,804,685 B2 | 10/2020 | Yang et al. |
| 11,005,246 B2 | 5/2021 | Mevius |
| D926,703 S | 8/2021 | Yang et al. |
| 11,239,643 B1 | 2/2022 | Gretz |
| 11,349,288 B2 | 5/2022 | Yang et al. |
| 11,515,693 B2 * | 11/2022 | Wade .................... H02G 3/081 |
| 11,581,717 B1 * | 2/2023 | Menton ................ H02G 3/083 |
| 11,588,268 B1 | 2/2023 | Baldwin |
| 12,021,360 B2 | 6/2024 | Wade |
| 2002/0046853 A1 | 4/2002 | Stendardo |
| 2003/0079894 A1 | 5/2003 | Weise |
| 2003/0192607 A1 * | 10/2003 | Wigmore ............ F15B 13/0857 |
| | | 137/884 |
| 2004/0094319 A1 | 5/2004 | Koessler |
| 2012/0325808 A1 * | 12/2012 | Batchelor ................ H02G 3/12 |
| | | 220/3.8 |
| 2015/0060441 A1 * | 3/2015 | Shotey .................. H02G 3/086 |
| | | 220/3.7 |
| 2017/0093140 A1 * | 3/2017 | Nikayin ................ H02G 3/125 |
| 2017/0110863 A1 | 4/2017 | Wentworth |
| 2017/0332498 A1 | 11/2017 | Larsson |
| 2018/0167020 A1 | 6/2018 | Truthseeker |
| 2018/0287550 A1 | 10/2018 | McPheeters et al. |
| 2018/0294631 A1 | 10/2018 | Segro |
| 2019/0132984 A1 * | 5/2019 | Huang ...................... G06F 1/18 |
| 2019/0305535 A1 | 10/2019 | Thompson |
| 2019/0334333 A1 * | 10/2019 | Wade .................... H02G 3/086 |
| 2023/0411942 A1 * | 12/2023 | Hicks ..................... B60R 16/02 |

FOREIGN PATENT DOCUMENTS

| | | | | |
|---|---|---|---|---|
| DE | 20119272 U1 * | 10/2002 | ............ | H02G 3/081 |
| EP | 1311042 A1 | 5/2003 | | |
| EP | 1458057 A2 * | 9/2004 | ............ | H02G 3/083 |
| JP | 5785811 | 9/2015 | | |
| WO | 2017066064 A1 | 4/2017 | | |
| WO | 2022096301 A1 | 5/2022 | | |

OTHER PUBLICATIONS

"EZ Solar JB-1.XL", Retrieved Dec. 8, 2022 from https://ezsolarproducts.com/jb-1-xl/.

"EZ Solar JB-2", Retrieved Dec. 8, 2022 from https://ezsolarproducts.com/jb-2/.

"Ironridge Jaybox Rail Mount", Retrieved Dec. 8, 2022 from https://www.ironridge.com/component/jaybox-junction-box/.

"Soltection RU-2-LP", Retrieved Dec. 13, 2022 from https://midanelec.com/products_data_sheet/Soltection-RU-2-LP.pdf, Dec. 2016.

"Unirac Solobox", Retrieved Dec. 8, 2022 from https://unirac.com/wp-content/uploads/bsk-pdf-manager/2022/06/SOLOBOX-Installation-Guide.pdf.

PCT/US2023/036693, "International Search Report and the Written Opinion of the International Searching Authority", dated Mar. 7, 2024, pp. 1-11.

Anonymous: "JayBox Junction Box—Protect the Nest", IRONRIDGE An Enstall Company, Sep. 6, 2022, XP093065570, Retrieved from the Internet: https://www.ironridge.com/component/jaybox-junction-box/.

Petition for Request for Ex Parte Reexamination of U.S. Pat. No. 12,021,360 dated Sep. 23, 2024 (83 pages).

Prosecution History of U.S. Pat. No. 12,021,360 to Benjamin Wade entitled "Junction Box with Lid Retention System" (595 pages).

Petition for Request for Ex Parte Reexamination of U.S. Pat. No. 12,003,085 dated Sep. 23, 2024 (86 pages).

Prosecution History of U.S. Pat. No. 12,003,085 to Benjamin Wade entitled "Junction Box with Protection Bosses" (394 pages).

* cited by examiner

RAIL-MOUNTABLE JUNCTION BOX

FIELD

The described embodiments relate generally to electrical junction boxes. In particular embodiments, the disclosure relates to rail-mountable junction boxes for solar array wire management on roof or wall structures.

BACKGROUND

Junction boxes can be used to receive, route, and connect portions of utility systems. For instance, junction boxes can receive electrical cables from one or more electrical components. The electrical cables can be electrically coupled to one another within the junction boxes. Additionally or alternatively, the electrical cables can connect to or otherwise route electricity to certain components inside a structure beyond a roof or wall. The junction boxes can be covered or otherwise closed, which can reduce external interaction with the electrical cables coupled therein.

Unfortunately, many conventional junction boxes are poorly suited to the harsh environment of rain, wind, sun, ice, and snow exposure over many years. Moreover, few conventional junction boxes can be mounted to a solar array rail structure. The few conventional junction boxes that do are significantly limited to narrow use cases or specific mounting applications. For example, some conventional junction boxes are only compatible with a singular type, model, and/or size of rail structure. An improved junction box with universal mounting capabilities is therefore needed.

The subject matter claimed herein is not limited to embodiments that solve any disadvantages or that operate only in environments such as those described above. Rather, this background is only provided to illustrate one example technology area where some embodiments described herein may be practiced.

SUMMARY

An aspect of the present disclosure relates to a junction box. In some embodiments, the junction box includes a housing with a bottom surface and sidewalls extending upward from a periphery of the bottom surface. In certain implementations, the sidewalls include a mounting sidewall to mount to a solar array rail structure. In addition, the junction box can include a lid positionable on the housing. Further, the junction box can include a mounting bracket. In some examples, the mounting bracket can include a first bracket connected to the mounting sidewall, the first bracket wall extending perpendicular to the mounting sidewall. Additionally, the mounting bracket can include a second bracket wall connected to the first bracket wall, the second bracket wall extending parallel to the mounting sidewall.

In some embodiments, the second bracket wall includes a retaining edge. The retaining edge can include a curved portion oriented toward the mounting sidewall. In these or other embodiments, the mounting bracket defines an interior portion sized and shaped to receive a rail mount; and the retaining edge and the mounting sidewall define a clearance distance for access into and out of the interior portion. Further, in some embodiments, the housing and the lid comprise a junction box weight at a center of gravity; and the junction box weight multiplied by a distance between the center of gravity and the second bracket wall defines a bending moment for the mounting bracket at the mounting sidewall.

In certain embodiments, the mounting bracket is a unibody bracket, the first bracket wall and the second bracket wall being inseparably connected. Additionally, in some embodiments, the mounting bracket comprises a reinforced connection between the mounting sidewall and the first bracket wall, the reinforced connection comprising at least one of increased material thickness or a fillet. In at least some embodiments, the mounting bracket further includes a third bracket wall connected to the second bracket wall and the mounting sidewall, the third bracket wall being parallel to the first bracket wall and perpendicular to the second bracket wall, and the third bracket wall at least partially enclosing an interior portion within the mounting bracket.

Another aspect of the present disclosure relates to a junction box that includes an interior bottom surface and sidewalls extending upward from a periphery of the interior bottom surface, where one of the sidewalls can include an exterior mounting surface. The junction box can further include a lid positionable on the sidewalls and a mounting bracket. In some embodiments, the mounting bracket is inseparably connected to the exterior mounting surface, the mounting bracket to mount to a solar array rail structure.

In particular embodiments, the junction box further includes an additional mounting bracket inseparably connected to the exterior mounting surface. In one or more embodiments, the mounting bracket includes a first bracket wall inseparably connected to the exterior mounting surface, the first bracket wall extending perpendicular to the exterior mounting surface; and a second bracket wall inseparably connected to the first bracket wall, the second bracket wall extending parallel to the exterior mounting surface. In certain embodiments, the mounting bracket further includes a retaining edge inseparably connected to the second bracket wall, the retaining edge oriented toward the exterior mounting surface.

In some embodiments, the junction box includes a DIN rail clip-in structure positioned on the interior bottom surface. In these or other embodiments, the interior bottom surface and the sidewalls form a rectangular-shaped housing. In at least one example, the sidewalls include a pair of drilling boundary indicators. In another example, the junction box includes a weep hole positioned within the interior bottom surface and extending through at least a portion of one of the sidewalls. In yet another example, the junction box includes: an exterior bottom surface opposing the interior bottom surface; a drill zone in the interior bottom surface; and a seal groove in the exterior bottom surface, wherein the drill zone corresponds to the seal groove.

Yet another aspect of the present disclosure relates to a rail-mountable system. In particular embodiments, the rail-mountable system includes a housing with an interior bottom surface and sidewalls extending upward from a periphery of the interior bottom surface. In some embodiments, one of the sidewalls includes an exterior mounting surface. The housing can further include a mounting bracket inseparably connected to the exterior mounting surface. The rail-mountable system can further include a lid positionable on the sidewalls and a rail mount. In some embodiments, the rail mount is attachable to the mounting bracket, the rail mount to mount to a solar array rail structure. In these or other embodiments, the rail mount includes a universal fit to the solar array rail structure. In at least one example, the rail mount includes an adjustable clamp.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
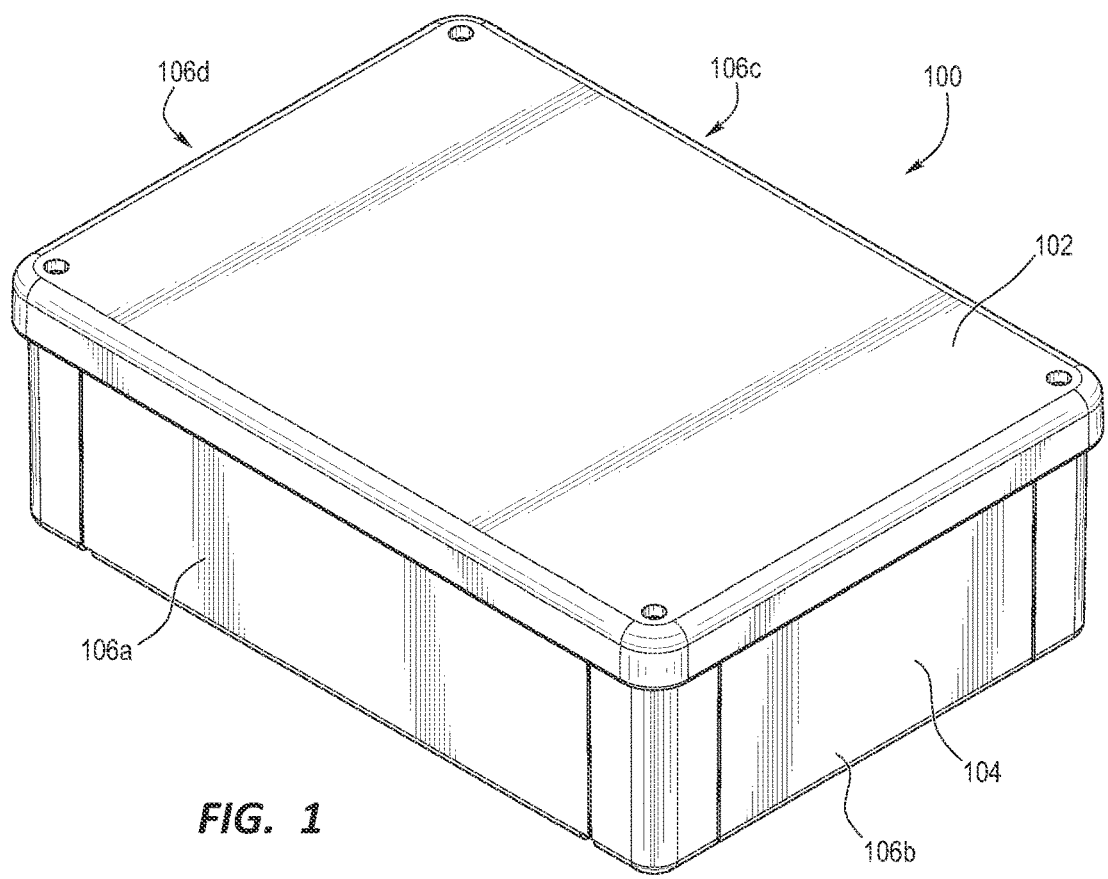
FIGS. 1-2 respectively illustrate top and bottom perspective views of an example junction box in accordance with one or more embodiments of the present disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a rail-mountable junction box. In one example, the rail-mountable junction box includes a housing sized and shaped for at least partially enclosing electrical components, cable routing into a structure, etc. A lid can be positioned over the housing to provide a secure, protective top covering. In some embodiments, the housing includes an exterior surface or mounting sidewall with mounting brackets (e.g., that are integrally connected to the mounting sidewall). These mounting brackets can include a low profile, sturdy hook (such as an L-shaped protrusion) for receiving a rail mount. In certain implementations, the mounting brackets also include a retention mechanism (e.g., a curled portion) for retaining the rail mount in place within the mounting bracket.

A rail mount can include a variety of attachment mechanisms insertable into the mounting brackets. In particular embodiments, a rail mount includes an adjustable clamp. Upon adjustment, the rail mount can attach the rail-mountable junction box to a solar array rail structure (e.g., a crossbar, support member, etc.) that mounts solar panels to a roof or wall structure. In the rail-attached position, the rail-mountable junction box can hang or suspend over a structure (e.g., a roof structure) by virtue of the cantilevered connection to the solar array rail structure.

As will be described in more detail below, the mounting brackets and the rail mount together can form a universal fit for myriad different solar array rail structures. Where conventional junction boxes are only compatible with a specific model or type of rail structure, the disclosed junction box is universally compatible with most, if not all, rail structures. Thus, the disclosed junction box can provide significant compatibility improvements over conventional junction boxes.

These and other embodiments are discussed below with reference to FIGS. 1-20D. However, those skilled in the art will readily appreciate that the detailed description given herein with respect to the figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 2:
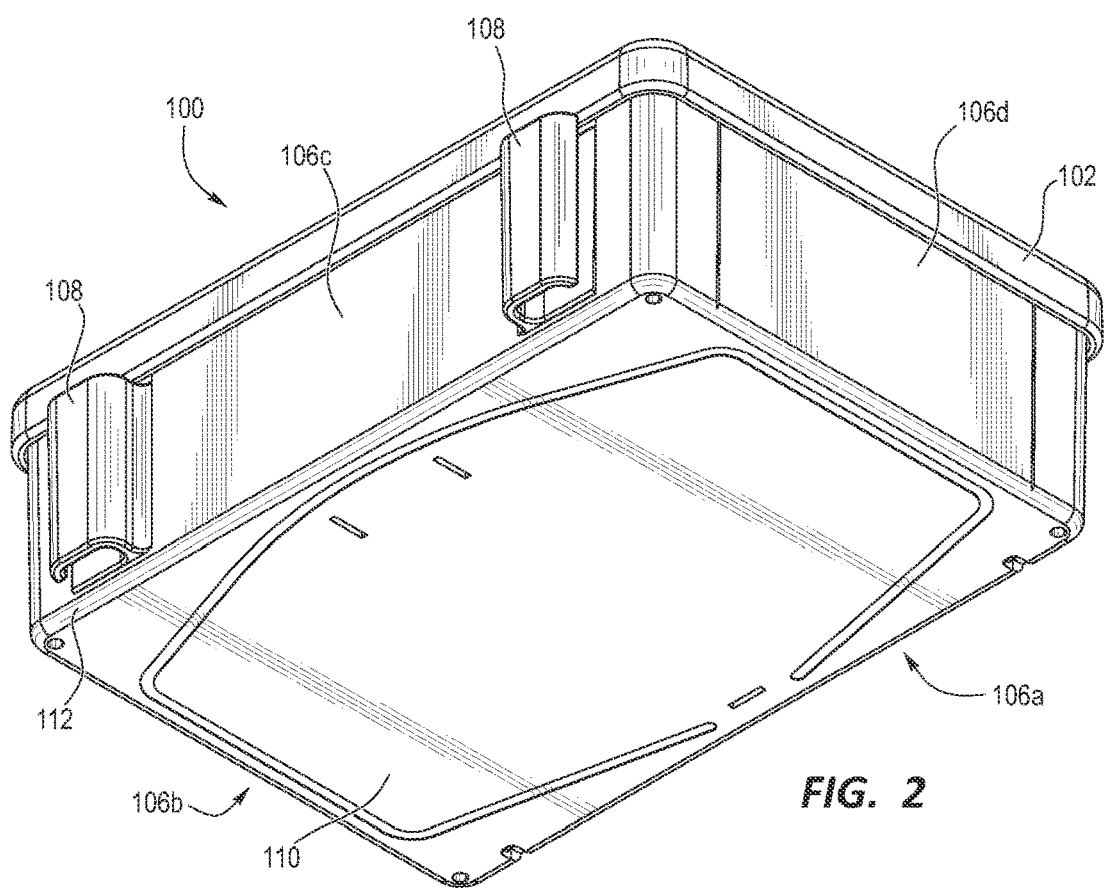

FIGS. 1-2 respectively illustrate a top perspective view and a bottom perspective view of an example rail-mountable junction box (hereafter "junction box") in accordance with one or more embodiments of the present disclosure. As shown, a junction box 100 includes a lid 102, a housing 104, and mounting brackets 108. Each is discussed in turn.

The lid 102 comprises a covering sized and shaped to at least partially enclose an interior portion within the housing 104. In some embodiments, the lid 102 comprises a weather resistant lid (e.g., rain, snow, ice, wind, and/or ultraviolet ray resistant). In other embodiments, the lid 102 is completely weatherproof (e.g., impervious to rain, snow, ice, wind, and/or UV rays). In these or other embodiments, the lid 102 forms a rigid, protective casing over the housing 104, thereby also protecting the internal volume of the housing 104 from exposure to debris, bugs, or even incidental foot trampling. Additional details of the lid 102 are discussed further below in relation to FIGS. 3-4 and FIGS. 12-16.

The housing 104 comprises a partial enclosure (e.g., for housing electrical components in transmission of solar array power). In particular, the housing 104 comprises sidewalls 106a-106d. The sidewalls 106a extend upwards from (e.g., substantially perpendicular to) an exterior bottom surface 110 of the housing 104. Specifically, the sidewalls 106a-106d extend upwards from the exterior bottom surface 110 along a periphery 112 (i.e., perimeter edge) of the housing 104. Like the lid 102, the sidewalls 106a-106d and the exterior bottom surface 110 can form a rigid, protective barrier around an internal volume of the housing 104 against the outside environment.

Together, the lid 102 and the housing 104 can mate or otherwise attach to each other—forming a protective seal or complete enclosure around the internal volume of the housing 104. For example, the lid 102 can be oriented parallel to the exterior bottom surface 110 and positioned on a top portion of each of the sidewalls 106a-106d. In such a position, the lid 102 and the housing 104 can be joined or fastened together (as will be explained below).

At least one of the sidewalls 106a-106d is a mounting sidewall with an exterior mounting surface. Such a mounting sidewall can mount to a solar array rail structure that supports a solar array and/or affixes a solar array to a roof structure. The mounting sidewall (in this case, the sidewall 106c) comprises the mounting brackets 108. Via the mounting brackets 108, the junction box 100 can attach to and suspend from a solar array rail structure. In particular, the mounting brackets 108 are sized and shaped to receive a rail mount (i.e., an attachment mechanism, not shown) that can removably attach the junction box 100 to a solar array rail structure. In some embodiments, the mounting brackets 108 are removably or permanently attached to the mounting sidewall. In other embodiments, the mounting brackets 108 are integrally formed with or tooled into the mounting sidewall as a continuous extension of the mounting sidewall. Further details of the mounting brackets 108 are provided below in relation to at least FIGS. 5-6.

In a rail-mounted position, the exterior bottom surface (and the junction box 100 as a whole) is raised above the roof structure—thereby avoiding direct contact with the roof structure. In this manner, the junction box 100 in a rail-mounted position can advantageously avoid or limit exposure to, for instance, rainwater that runs down a sloped roof structure or the wedging buildup of snow and ice.

In these or other embodiments, the junction box 100 can comprise one or more of a variety of materials. These materials can withstand the environmental elements, as well as the duration of use (e.g., 20+ years). In some embodiments, the junction box 100 comprises a rigid, stiff material (e.g., metal). Additionally or alternatively, the junction box 100 comprises a flexible or soft material (e.g., elastomer, rubber, rubber with saturated polymer backbones, ethylene propylene diene monomer rubber, etc.). In at least some examples, the junction box 100 comprises a non-conductive material or a UV-resistant material. In particular embodiments, the junction box 100 comprises a plastic material, a polycarbonate material, a polyvinyl chloride (PVC) material, an acrylonitrile butadiene styrene (ABS) material, acrylonitrile styrene and polycarbonate blend (ASA+PC) material, a polycarbonate and ABS blend (PC+ABS) material, etc. In another example, the junction box 100 comprises an acrylic material, a high density polyethylene material, polyamide-imide material, a polyvinylidene fluoride material, or a hydroxyphenyl benzotriazole material.

The junction box 100 can also be manufactured in a variety of different ways. In some embodiments, the junction box 100 is formed via molding, tooling, 3D-printing, casting, forging, or machining methods. In particular embodiments, the junction box 100 can be formed utilizing injection molding techniques. Additionally, in certain implementations, multiple versions of the junction box 100 can be formed simultaneously. For example, two or more of the junction box 100 can be injection molded utilizing multi-cavity tooling.

Further, the junction box 100 can be formed with a variety of strength-enhancing features. For example, the junction box 100 can include rounded corners, fillets, etc. that can reduce stress concentrations and improve rigidity/strength. To illustrate, the joint between the sidewalls 106a-106d and the exterior bottom surface can include a fillet.

Likewise, the junction box 100 can be formed with a variety of manufacturing enhancement features. For example, in some embodiments, the sidewalls 106a-106d are not perfectly perpendicular relative to the exterior bottom surface. Instead, the sidewalls 106a-106d are positioned at least a half degree off 90 degrees to allow easier retraction or withdrawal of the injection molding tooling. As another example, the junction box 100 includes a built-in flashing without additional (or excess) material extending away from the housing 104. For example, a portion of the interior bottom surface 306 (described below) surrounding a seal groove can help block or shed water from entering inside the housing 104. Such example configurations can advantageously reduce material consumption.

Any of the features, components, and/or parts, including the arrangements and configurations thereof shown in FIGS. 1-2 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 1-2.

Various example features of the lid 102 and the housing 104 will now be discussed in relation to FIGS. 3-4. In particular, FIGS. 3-4 respectively illustrate top and bottom exploded views of the junction box 100 in accordance with one or more embodiments of the present disclosure.

As shown, the lid 102 comprises lid holes 302, and the housing 104 comprises housing holes 304. The lid holes 302 and the housing holes 304 are alignable to receive a fastener that, when fastened, secures the lid 102 and the housing 104 together. In some embodiments, at least one of the lid holes 302 or the housing holes 304 are threaded to engage a correspondingly threaded fastener (e.g., bolt or screw). In some embodiments, at least one of the lid holes 302 or the housing holes 304 are threadless. In certain implementations, at least one of the lid holes 302 or the housing holes 304 are self-tapping holes, subject to the tapping threads of a fastener. Still, in other embodiments, one of the lid holes 302 or the housing holes 304 can include captive fasteners that are positionally bound within the hole. Further, other embodiments of the lid 102 include a snap-on lid, an interference-fit lid, or a slide-on lid.

The housing 104 also includes an interior bottom surface 306 that opposes the exterior bottom surface 110. Together with the sidewalls 106a-106d, the interior bottom surface 306 bounds an internal volume of the housing 104. In particular, the interior bottom surface 306 spans between a periphery 308 (e.g., an internal perimeter) of the housing 104. The interior bottom surface 306 comprises a variety of features (e.g., for mounting electrical components, drilling thru-holes, evacuating water condensation, and/or positionally orienting an installer).

To illustrate, the interior bottom surface 306 comprises a drill zone 310. The drill zone 310 corresponds to an area that can be drilled, punctured, or knocked out (e.g., for providing access to a cable or conduit). The drill zone 310 can be sized and shaped for at least one drill-hole. In particular embodiments, the drill zone 310 is sized and shaped to accommodate multiple 1-inch drill holes. Moreover, as will be described below in relation to FIG. 9, the drill zone 310 can be sized and shaped to correspond with (e.g., fit inside of) a seal groove 406 in the exterior bottom surface.

The interior bottom surface 306 further comprises a DIN rail clip-in 312. The DIN rail clip-in 312 comprises one or more elements to secure a DIN rail to the interior bottom surface 306. In particular, the DIN rail clip-in 312 comprises elements that can secure a DIN rail to the interior bottom surface 306 without the use of fasteners. To illustrate, the DIN rail clip-in 312 includes a first portion (not shown) that secures a first DIN rail end and a second portion that secures a second DIN rail end. Further aspects of the DIN rail clip-in 312 are described below in relation to FIGS. 10-11.

Although illustrated in a particular orientation (e.g., front-to-back or north-to-south), those of ordinary skill in the art will appreciate that the DIN rail clip-in 312 can be arranged in a variety of different orientations and configurations. For example, the DIN rail clip-in 312 can be oriented side-to-side (east-to-west) or diagonally toward opposing corners. As another example, the DIN rail clip-in 312 can be positioned off-center on the interior bottom surface 306. Similarly, in some embodiments, the interior bottom surface 306 can include multiple DIN rail clip-ins (e.g., the DIN rail clip-in 312 as shown plus an additional DIN rail clip-in running side-to-side perpendicular to the DIN rail clip-in 312).

In at least some embodiments, a DIN rail is also positionable on top of a DIN rail support structure 322. For example, a bottom surface of a DIN rail can physically rest (e.g., contact or abut) the DIN rail support structure 322. As shown, the DIN rail support structure 322 comprises one or more blocks, ribs, or raised protrusions that extend upward from the interior bottom surface 306. In particular embodiments, the DIN rail support structure 322 has a height of about 1 millimeter to about 10 millimeters, as may be desired. Thus, the DIN rail support structure 322 can advantageously suspend a DIN rail above the interior bottom surface 306 to reduce or eliminate trapped moisture on the interior bottom surface 306. Instead of moisture pooling around the DIN rail, moisture can freely pass underneath the suspended DIN rail and out of weep holes 316 discussed below.

The housing 104 also includes weep holes 316. The weep holes 316 can promote the evacuation of condensation inside the housing 104. Additionally or alternatively, the weep holes 316 can vent air or otherwise facilitate air exchange into and out of the housing 104 (thereby drying out condensation). In some embodiments, the weep holes 316 are positioned within the interior bottom surface 306 (and the exterior bottom surface) and the sidewalls 106a-106d. That is, the weep holes 316 can comprise thru-holes that extend from the interior bottom surface 306 to the exterior bottom surface and extend upwards along a portion of the sidewall 106a. By extending upwards along the sidewall 106a, condensation can be evacuated notwithstanding the different possible orientations or angles of the junction box 100 (whether suspended over a roof structure or side-mounted on the side of a house).

The weep holes 316 can be arranged in various different ways and locations. In particular embodiments, the weep holes 316 are located adjacent to bottom corners of the sidewall 106a. In this position, the sloped suspension of the junction box 100 and the effect of gravity can draw condensation out of the weep holes 316 in the sidewall 106a. In other embodiments, the weep holes 316 are located in a central portion of one or more of the sidewalls 106a-106d at the periphery 308 and the periphery 112. Still, in other embodiments, the weep holes 316 are interspaced along the periphery 308 and the periphery 112.

The housing 104 also includes standoffs 318 positioned on the interior bottom surface 306. The standoffs 318 can define a recess for receiving fasteners. Protruding up from the interior bottom surface 306, the standoffs 318 can specifically include a recess sized and shaped to provide engagement with the fasteners, yet prevent the fasteners from penetrating the interior bottom surface 306. In particular embodiments, the standoffs 318 can be used to attach grounding bars, grounding lugs, DIN rails, or other suitable element within the internal volume of the housing 104. The standoffs 318 can be positioned in a variety of different configurations, as may be desired. In particular implementations, however, the standoffs 318 are positioned in pairs adjacent to the sidewall 106c.

The housing 104 further includes a boss 320 positioned within the interior bottom surface 306. The boss 320 includes a thru-hole or a knock-out for creating a thru-hole. Fasteners can be inserted through the boss 320 to secure the housing 104 to a roof structure or a wall structure (e.g., for non-rail mounted positions of the junction box 100). Although not shown in FIG. 3, the housing 104 can include multiple bosses 320 (e.g., four bosses interspaced across the interior bottom surface 306).

The housing 104 also includes drilling boundary indicators 314. The drilling boundary indicators 314 comprise a visual or tactile indication where sidewall drilling is permitted (i.e., in a central area between a pair of the drilling boundary indicators 314 on a given sidewall). Outside of the drilling boundary indicators 314 toward a corner area, there is potentially less room (or insufficient room) for a housing-internal conduit fitting to secure a conduit positioned inside the sidewalls 106a-106d. In at least some embodiments, the drilling boundary indicators 314 are positioned on select sidewalls, (e.g., three sidewalls not abutting a solar array rail structure, such as the sidewalls 106a, 106b, 106d). In other embodiments, the drilling boundary indicators 314 are positioned on each of the sidewalls 106a-106d.

The drilling boundary indicators 314 can, in certain implementations, include an indented groove, a raised rib, etc. In some embodiments, the drilling boundary indicators 314 can include laser markings or other indicia. Additionally or alternatively, portions of the sidewalls 106a-106d on opposite sides of the drilling boundary indicators 314 can include different colors, indicia, or visual/tactile patterns. Further detail of the drilling boundary indicators 314 are discussed below in relation to FIGS. 15-16.

Figure 4:
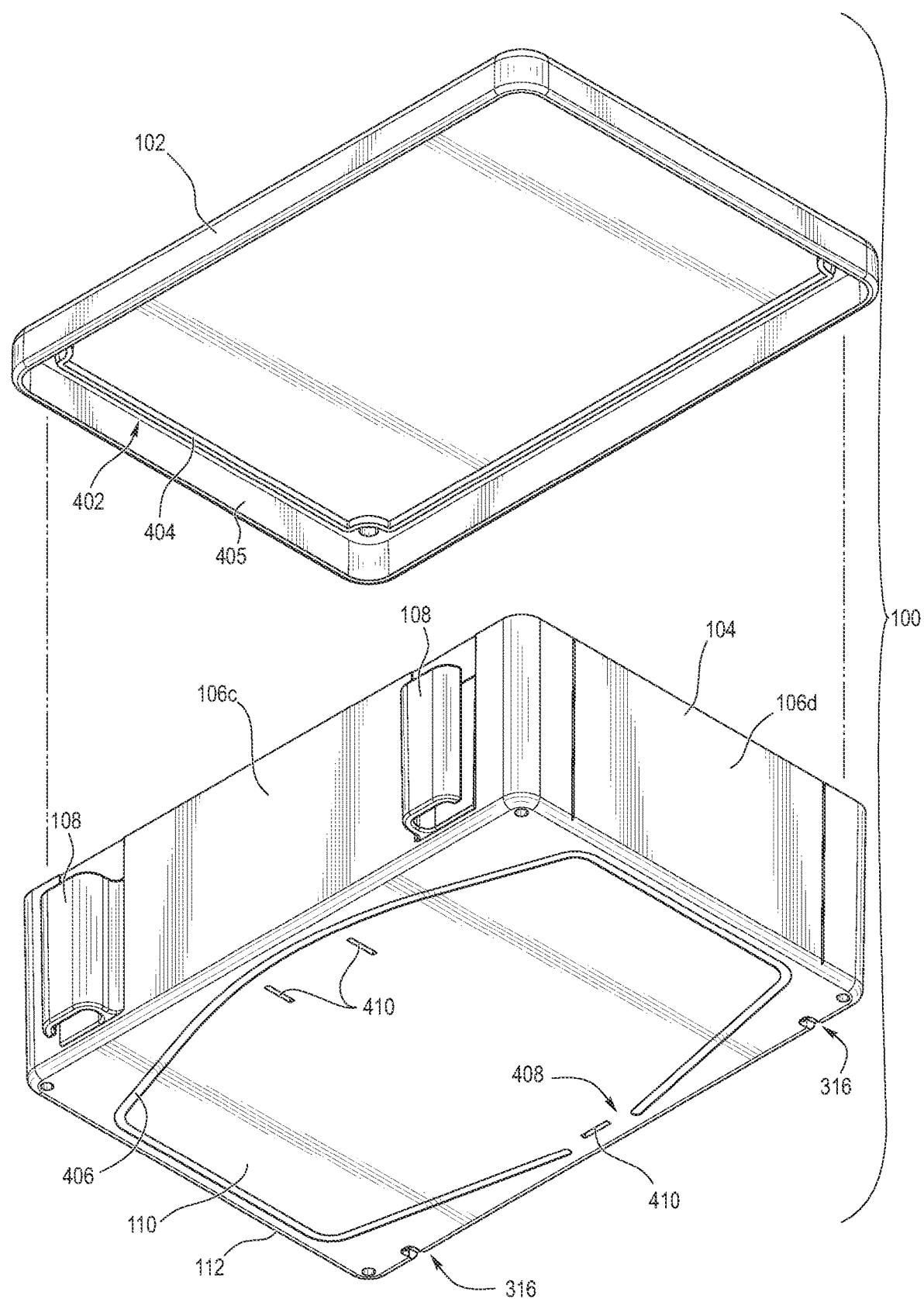

As shown in FIG. 4, the underside of the lid 102 further includes a gasket channel 402 defined by a gasket wall 404 and a flange 405. Specifically, the gasket channel 402 is positioned between the gasket wall 404 and the flange 405. The gasket wall 404 includes raised rib, surface protrusion, or jutted lip that runs around the perimeter of the lid 102. The gasket wall 404 is parallel to the flange 405 and circumscribes the lid holes 302. In addition, the gasket wall 404 is sized and shaped to retain a gasket against the flange 405. The flange 405 comprises the side portion of the lid 102, including the portion of the lid 102 which envelops an outer perimeter of the housing 104.

A variety of different gaskets (not shown) can be positioned inside of the gasket channel 402, such as an O-ring, a formed in place (FIP) gasket, or a cure in place (CIP) gasket. In these or other embodiments, the gasket can be pliable so as to conform to the gasket channel 402. For example, in response to positioning (and securing) the lid 102 in place over the housing 104, the gasket can compress against the lid 102. In so doing, the gasket can form a seal against the gasket wall 404 and the flange 405. In certain implementations, the formed seal comprises a hermetic seal, waterproof seal, etc.

FIG. 4 further shows the housing 104 comprises a seal groove 406. The seal groove 406 can be particularly advantageous for non-rail mounted positions of the junction box 100 (e.g., when the junction box 100 is directly fastened to a roof structure or wall structure instead of suspended from a solar array rail structure). In some embodiments, the seal groove 406 comprises a sealant guide for applying sealant, adhesive, tape, or a gasket to the housing 104. The seal groove 406 can include a partial perimeter around the exterior bottom surface. In other embodiments, the seal groove 406 can include an entire perimeter around the exterior bottom surface. In some examples, the seal groove 406 is sized and shaped to encompass the drill zone 310 (as will be described more below in relation to FIG. 9). Additionally, in some examples, the seal groove 406 is shaped to include a leading vertex or corner (whether rounded or pointed). With such geometry, the sealant positioned along the seal groove 406 can more easily shed or divert water away from (or at least around) the housing 104.

As just mentioned, the seal groove 406 can include a partial perimeter around the exterior bottom surface. This partial perimeter can form a gap 408. The gap 408 can advantageously allow the area between the exterior bottom surface and a supporting structure (e.g., a wall structure or roof structure) to breathe and/or evacuate condensation. In particular embodiments, the housing 104 comprises additional weep holes 410 formed in the exterior bottom surface. The additional weep holes 410 can be located in a variety of locations. However, in some embodiments, the additional weep holes 410 are positioned at areas corresponding to the DIN rail clip-in 312, as will be described more below in relation to FIGS. 10-11. Thus, fluid or condensation can be evacuated from the additional weep holes 410 and out through the gap 408. In this manner, the gap 408 can be in fluid communication with the additional weep holes 410.

Figure 3:
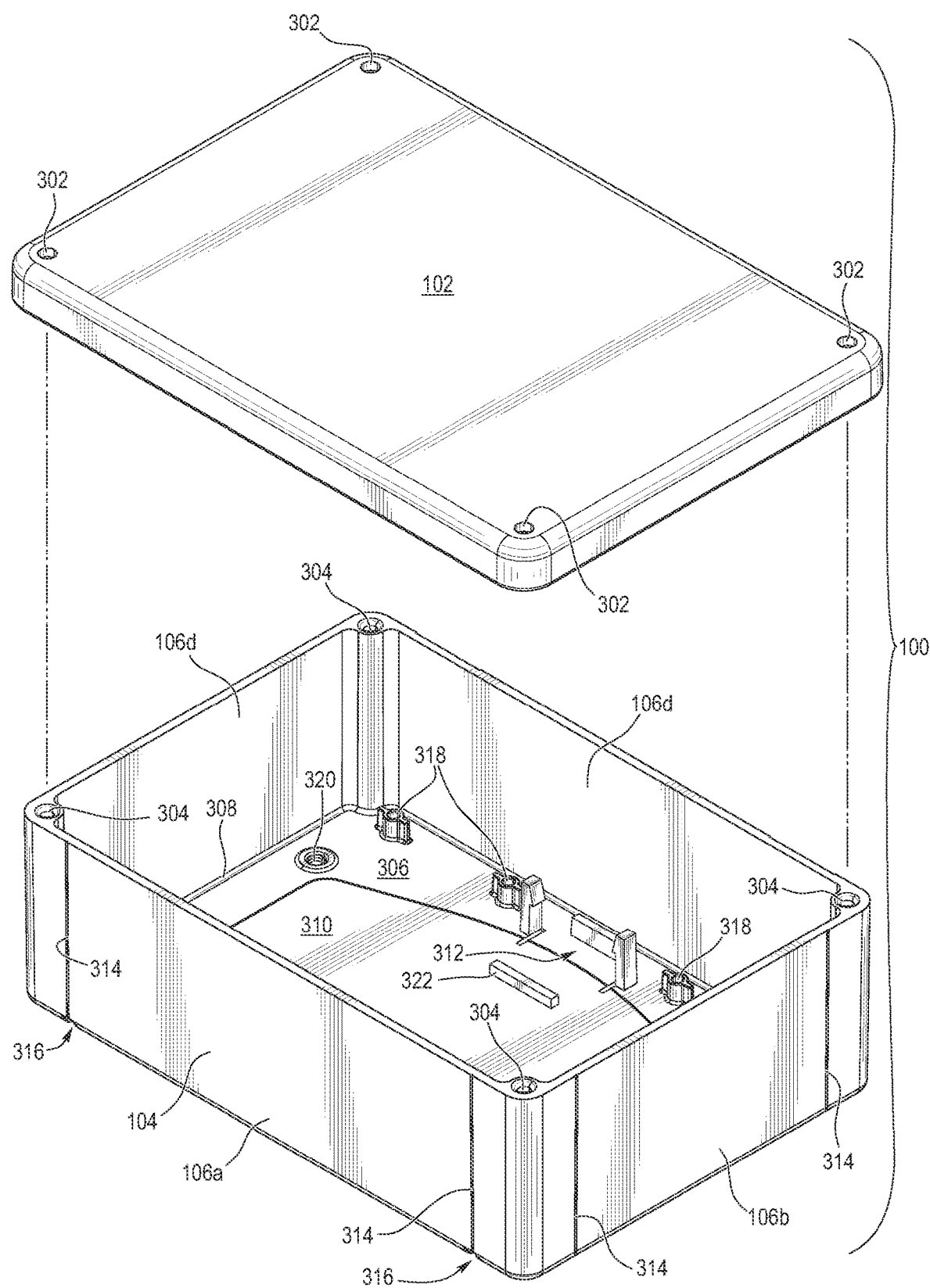
FIGS. 3-4 respectively illustrate top and bottom exploded perspective views of a junction box in accordance with one or more embodiments of the present disclosure.

Any of the features, components, and/or parts, including the arrangements and configurations thereof shown in FIGS. 3-4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 3-4.

Additional detail regarding the mounting brackets 108 is now provided. In particular, FIGS. 5-6 respectively illustrate top and perspective views of the mounting brackets 108 in accordance with one or more embodiments of the present disclosure. As shown, the mounting brackets 108 includes a first bracket wall 502, a second bracket wall 504, and a retaining edge 506. The first bracket wall 502 is connected to the sidewall 106c (i.e., the mounting sidewall). In some embodiments, the connection between the first bracket wall 502 and the mounting sidewall comprises a reinforced connection 514. The reinforced connection 514 can include additional material (e.g., an increased thickness of material). Additionally or alternatively, the reinforced connection 514 can include a fillet (as opposed to sharp corner).

At the reinforced connection 514, the first bracket wall 502 can extend substantially perpendicularly away from the mounting sidewall. The second bracket wall 504 then connects to the opposing end of the first bracket wall 502 (e.g., in a substantially perpendicular fashion). The second bracket wall 504 extends away from the first bracket wall 502 in manner substantially parallel to the mounting sidewall. The retaining edge 506 further connects to the second bracket wall 504. The retaining edge 506 comprises a curved portion oriented toward the mounting sidewall.

The various members of the mounting brackets 108 just described can be attached together in a variety of ways. In some embodiments, each of the first bracket wall 502, the second bracket wall 504, and the retaining edge 506 can be integrally (or inseparably) formed together as a continuous, unibody bracket. For example, the first bracket wall 502, the second bracket wall 504, and the retaining edge 506 can be molded, tooled, 3D-printed, cast, forged, or machined as a single piece. In other examples, at least one of the first bracket wall 502, the second bracket wall 504, or the retaining edge 506 can be attached (whether permanently or non-permanently). For instance, at least one of the first bracket wall 502, the second bracket wall 504, or the retaining edge 506 can be bonded, adhered, fastened, press fit, or interlocked together.

In these or other embodiments, the various members of the mounting brackets 108 define an interior portion 510 accessible by a clearance distance 512. In particular embodiments, the interior portion 510 is sized and shaped to receive a rail mount (see FIGS. 19-20D). For example, the interior portion 510 is sized and shaped to receive a clamp, zip tie, Velcro® strip, bailing wire, rope, string, or tape.

Likewise, the clearance distance 512 can be sized to permit convenient, quick access into the interior portion 510 for certain types of rail mounts. Additionally or alternatively, the clearance distance 512 can be sized to retain a rail mount within the interior portion 510 (e.g., such that a rail mount does not slip or fall out of the interior portion 510). That is, the retaining edge 506 curves inward to form a choke point—which having the clearance distance 512—can be sufficiently small to help prevent a rail mount from slipping out of the mounting brackets 108. To illustrate, the clearance distance 512 can range from 0.1 inches to 0.75 inches.

In a particular use case, as will be described below in relation to FIGS. 20A-20D, the retaining edge 506 defining the clearance distance 512 can even retain a rail mount that has yet to be tightened or fastened to a solar array rail structure. Advantageously, this can allow an installer to handle the junction box 100 without worry or hassle of a rail mount falling out of the mounting brackets 108.

In certain implementations, the mounting brackets 108 can further include an optional mounting plate 508. In particular embodiments, the optional mounting plate 508 abuts the surface of the mounting sidewall (the sidewall 106c) in a parallel fashion. In addition, the optional mounting plate can adjoin the first bracket wall 502 (e.g., at the reinforced connection 514). In these or other embodiments, the optional mounting plate can provide increased stability or rigidity for the mounting brackets 108. In particular embodiments, the optional mounting plate can provide increased resistance to an applied bending moment (discussed more below in relation to FIG. 9) by spreading the transferred load across the surface of the optional mounting plate. Alternatively, in some embodiments, the optional mounting plate can be omitted from the mounting brackets 108.

In some embodiments, the mounting brackets 108 can be attached to the mounting sidewall (the sidewall 106c) in various ways. For example, the mounting brackets 108 can be integrally (or inseparably) formed as part of the mounting sidewall (e.g., via molding, tooling, 3D-printing, casting, forging, or machining methods). As another example, the mounting brackets 108 can be permanently or removably attached to the mounting sidewall. For instance, the mounting brackets 108 can be fastened, bonded, adhered, or interlocked with the mounting sidewall.

In at least one embodiment, the mounting brackets 108 are slidably attached to the mounting sidewall (the sidewall 106c). For example, the mounting brackets 108 and the mounting sidewall can include one or more corresponding geometries or mating structures (e.g., tongue and groove, T-slots, lap joints, dovetail joints, box joints, dado joints, lap joints, butt joints, mortise and tenon joints, birdsmouth joints, bridle joints, pocket-hole joints, etc.) To illustrate, the mounting sidewall can include a slotted region sized and shaped to slidably receive at least one of the reinforced connection 514 or the optional mounting plate 508. In such an example, the mounting brackets 108 are held within the slotted region via overhanging portions on the mounting sidewall, thereby creating an interference fit with the mounting brackets 108. Optionally, the slotted region can include one or more caps or stops to prevent the mounting brackets 108 from incidental withdrawal out of the slotted region.

Figure 7:
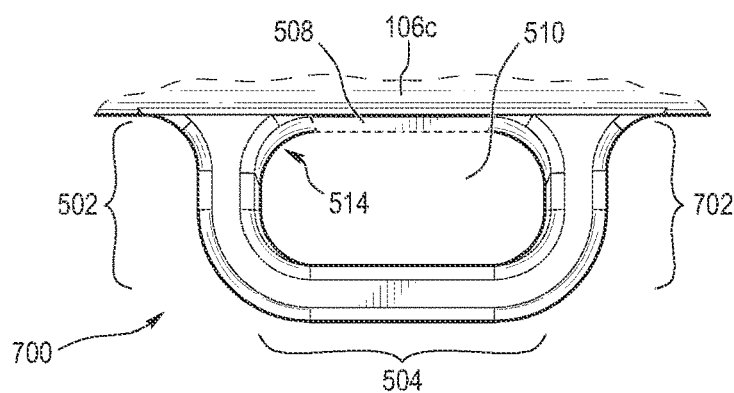
FIG. 7 illustrates a top view of another example mounting bracket in accordance with one or more embodiments of the present disclosure.

Those of ordinary skill in the art will appreciate that the mounting brackets 108 can include other configurations. For example, the mounting brackets 108 can include a closed-loop bracket as shown in FIG. 7. In this figure, a mounting bracket 700 comprises the same or similar elements as the mounting brackets 108. However, instead of the retaining edge 506, the mounting bracket 700 comprises a third bracket wall 702 at least partially enclosing the interior portion 510. In particular, the third bracket wall 702 connects the second bracket wall 504 and the mounting sidewall (the sidewall 106c). In doing so, the third bracket wall 702 is formed parallel to the first bracket wall 502, and perpendicular to both of the second bracket wall 504 and the mounting sidewall. Together, the first bracket wall 502, the second bracket wall 504, and the third bracket wall 702 form a closed loop.

In this example configuration, a rail mount can be threaded through the interior portion 510 to engage the mounting brackets 108 (as opposed to entering and exiting the interior portion 510 via the clearance distance 512). Without the clearance distance 512, the mounting bracket 700 can, in certain instances, more easily retain a rail mount. Additionally or alternatively, the third bracket wall 702 can provide increased strength and rigidity for the mounting bracket 700. For instance, the third bracket wall 702 can approximately halve the bending load that the mounting brackets 108 undergoes at the reinforced connection 514 (e.g., by splitting the bending moment transferred through connections of the first bracket wall 502 and the third bracket wall 702 to the mounting sidewall).

Figure 5:
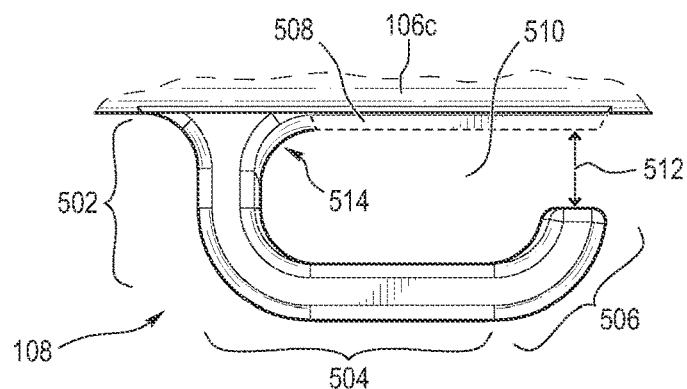
FIGS. 5-6 respectively illustrate top and perspective views of a mounting bracket in accordance with one or more embodiments of the present disclosure.
Figure 6:
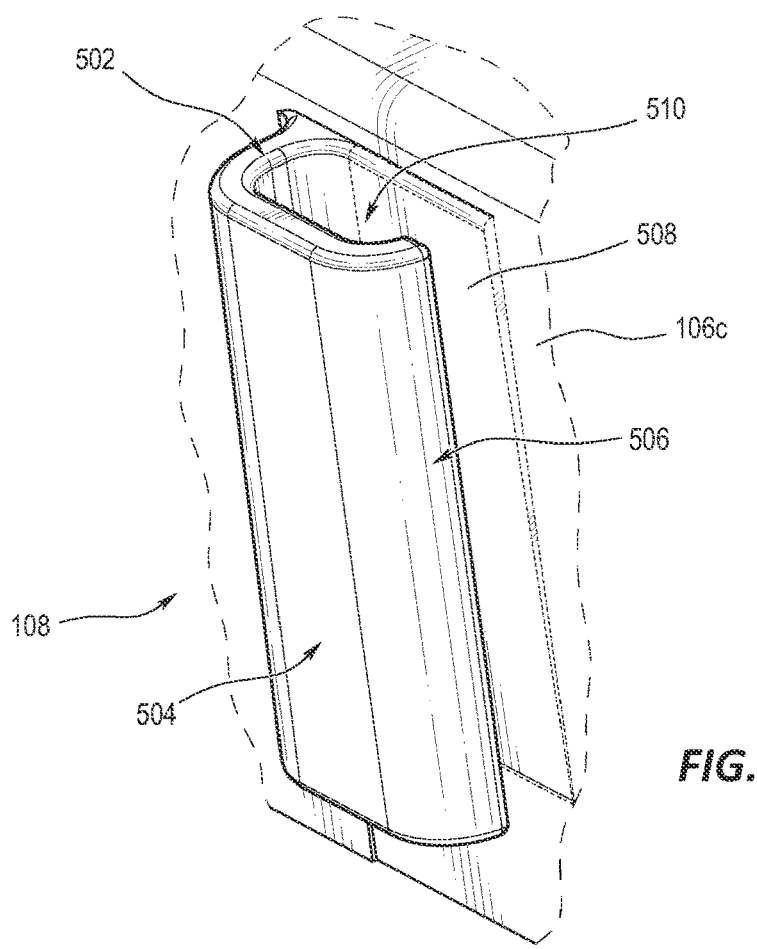

Any of the features, components, and/or parts, including the arrangements and configurations thereof shown in FIGS. 5-7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 5-7.

Figure 8:
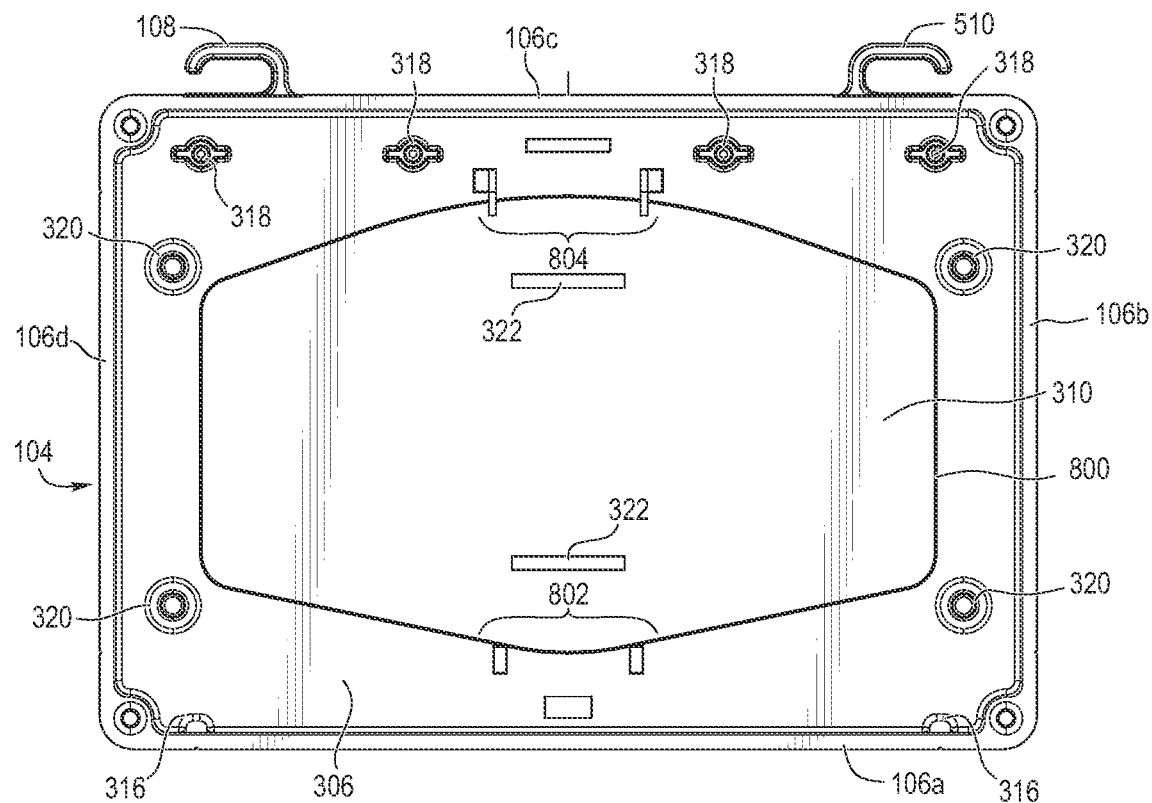
FIGS. 8-9 respectively illustrate top and bottom views of a junction box housing in accordance with one or more embodiments of the present disclosure.

Some additional detail regarding the housing 104 is now presented. In particular, FIGS. 8-9 respectively illustrate top and bottom views of the housing 104 in accordance with one or more embodiments of the present disclosure. In particular, FIG. 8 illustrates a drill zone boundary 800 around the drill zone 310. In some embodiments, the drill zone boundary 800 comprises a tactile or visual groove defined by the interior bottom surface 306. In other embodiments, the drill zone boundary 800 comprises a laser marking, raised protrusion, patterned or colored indicia, etc. In this manner, the drill zone boundary 800 can provide visual and/or tactile feedback for easily and conveniently locating the drill zone 310 within the interior bottom surface 306.

In these or other embodiments, the drill zone boundary 800 can be sized and shaped for a variety of configurations. Indeed, as mentioned above, the drill zone 310 (and therefore the drill zone boundary 800) can be sized and shaped to accommodate multiple thru-holes (e.g., with one-inch fittings). In particular embodiments, the drill zone 310 (and therefore the drill zone boundary 800) can be sized and shaped to accommodate a particular positional arrangement of thru-holes, as may be desired based on cable entry location.

Figure 9:
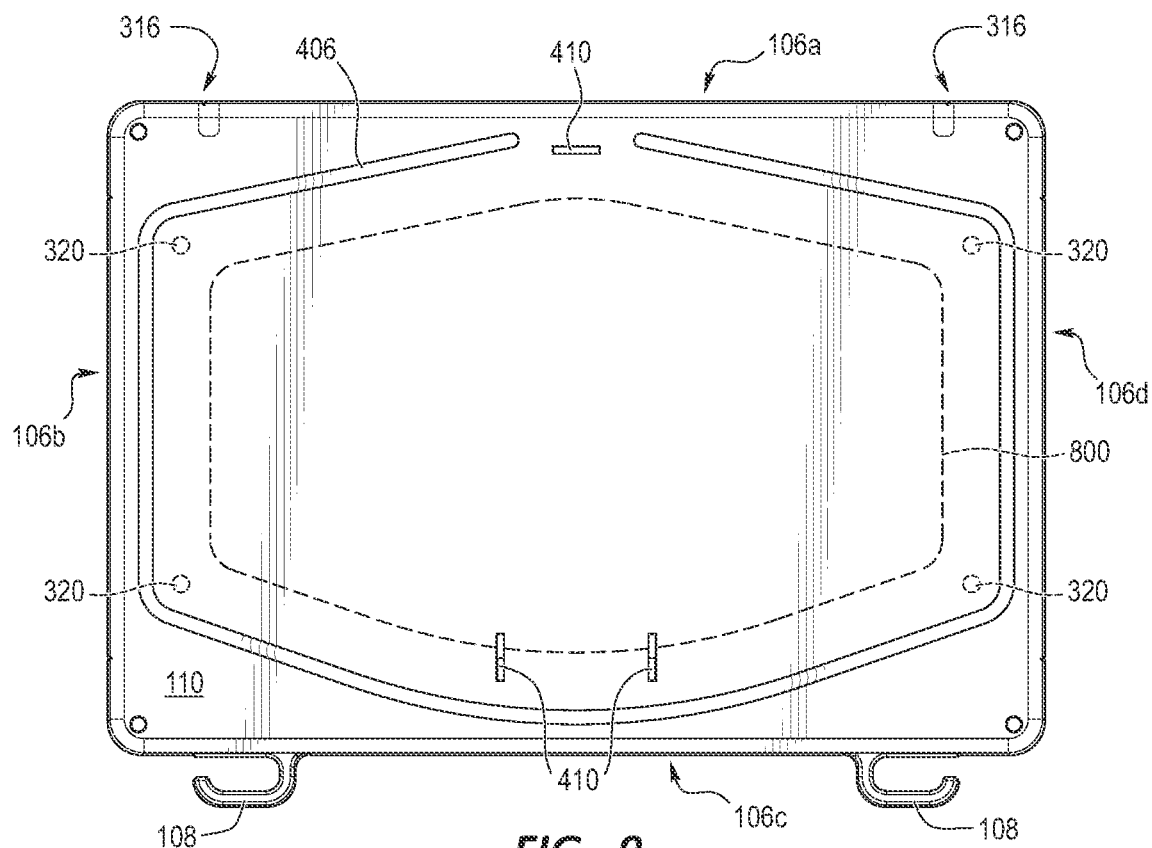

Moreover, as shown in FIG. 9, the drill zone boundary 800 is sized and shaped to fit inside of the seal groove 406 defined by the exterior bottom surface. In these or other embodiments, the drill zone boundary 800 is positionally offset from the seal groove 406 (e.g., to provide a buffer region for incidental error in either sealant application or drilling). For example, the drill zone boundary 800 is positionally offset from the seal groove 406 by a range of 0.1 inches to 3 inches, and in particular implementations, by 0.5 inches. Thus, sealant applied along the seal groove 406 can help prevent water infiltration into a thru-hole positioned within the drill zone 310 (i.e., on or inside of the drill zone boundary 800), as well as any corresponding holes into a roof or wall structure to route a cable or wire.

Those of ordinary skill in the art will appreciate that sealant can include myriad different types of seals. For example, sealant can include a gel-type sealant, a caulk-type sealant, a foam sealant, a rubber seal, a tar seal, a tape seal (e.g., Butyl seal, peel-and-stick seal), a compression seal, an expansion seal, etc. Additionally or alternatively, sealant can include a seal formed by way of chemical reaction, change of state (e.g., liquid to solid), or change in size (to name a few examples).

FIGS. 8-9 further show an arrangement of the standoffs 318 and the bosses 320 discussed above. As shown, the bosses 320 comprise four knock-outs or thru-holes interspaced in a rectangular fashion across the interior bottom surface 306 (albeit other configurations are herein contemplated). In some embodiments, the bosses 320 are positioned outside of the drill zone 310. Thus, the bosses 320 do not reduce the useable footprint of the drill zone 310. Additionally, in particular embodiments, the bosses 320 are positioned inside of the seal groove 406 (as shown in FIG. 9). In this manner, sealant applied along the seal groove 406 can help prevent water infiltration into the bosses 320, as well as water infiltration into corresponding holes into a roof or wall structure to engage a fastener.

In addition, FIG. 8 shows a first end portion 802 and a second end portion 804 of the DIN rail clip-in 312. Together, the first end portion 802 and the second end portion 804 can secure a DIN rail inside the housing 104. In particular, the first end portion 802 can secure a first end of a DIN rail, and the second end portion 804 can secure a second end of a DIN rail. The particular aspects of the first end portion 802 and the second end portion 804 are discussed below in relation to FIGS. 10-11, respectively.

Any of the features, components, and/or parts, including the arrangements and configurations thereof shown in FIGS. 8-9 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 8-9.

Figure 10:
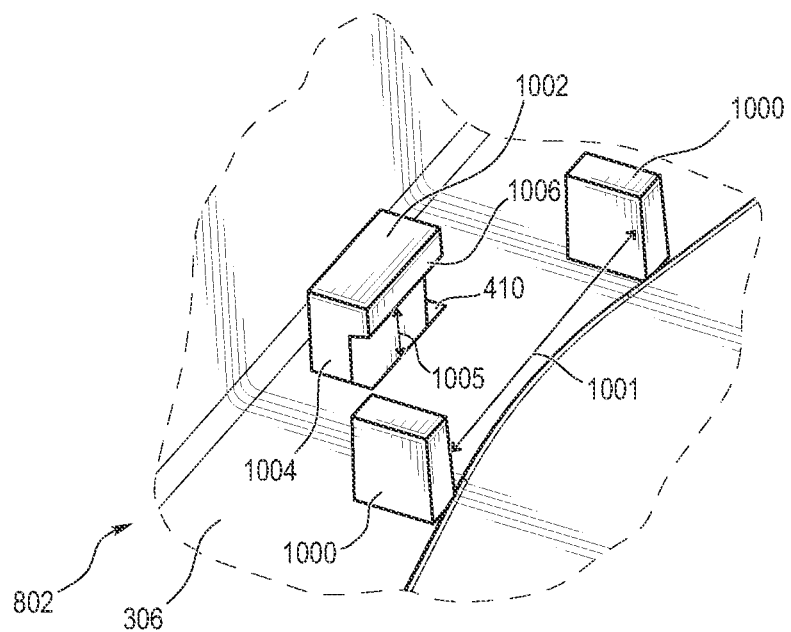
FIG. 10 illustrates a first end portion of a DIN rail clip-in in accordance with one or more embodiments of the present disclosure.

FIG. 10 illustrates the first end portion 802 in accordance with one or more embodiments of the present disclosure. As, shown, the first end portion 802 comprises guide posts 1000. The guide posts 1000 include opposing arms that protrude upwardly (e.g., substantially perpendicularly) from the interior bottom surface 306. In particular, the guide posts 1000 are spaced apart a distance 1001. The distance 1001 can correspond to a DIN rail width (as measured between opposing shoulders or rails on a DIN rail). In particular embodiments, the distance 1001 is between 25 millimeters and 50 millimeters.

Further, the first end portion 802 comprises an end holder 1002. The end holder 1002 includes a base 1004 and a lip 1006. The base 1004 connects the end holder 1002 to the interior bottom surface 306 and juts upwardly (e.g., substantially perpendicularly) from the interior bottom surface 306. The lip 1006 then integrally connects to the base 1004 and extends perpendicularly away from the base 1004 (e.g., toward the second end portion 804 of the DIN rail clip-in 312, not shown). In these or other embodiments, the base 1004 and the lip 1006 form an L-shaped protrusion or riser oriented toward the guide posts 1000. In particular, the underside of the lip 1006 is positioned at a height 1005 above the interior bottom surface 306. The height 1005 can correspond to a DIN rail wall thickness. For example, the height 1005 can range from 0.5 millimeters to 5 millimeters.

Together, the guide posts 1000 and the end holder 1002 can secure an end portion of a DIN rail. For example, a DIN rail can be slid between the guide posts 1000, thereby ensuring the DIN rail is properly aligned. In some embodiments, the guide posts 1000 contact the DIN rail, which can also provide support or stability to the DIN rail. In other embodiments, the guide posts 1000 do no contact the DIN rail. Rather, the guide posts 1000 can be for visual aid purposes. In addition, the DIN rail can be slid toward the end holder 1002 such that a bottom edge of the DIN rail slides underneath the lip 1006. Once underneath the lip 1006, the corresponding portion of the DIN rail can be pivotably anchored in place. That is, once one end of the DIN rail is positioned between the guide posts 1000 and inside the end holder 1002, the opposite portion of the DIN rail can be pivoted toward the second end portion 804 for locking into place (as will be described in relation to FIG. 11).

Figure 11:
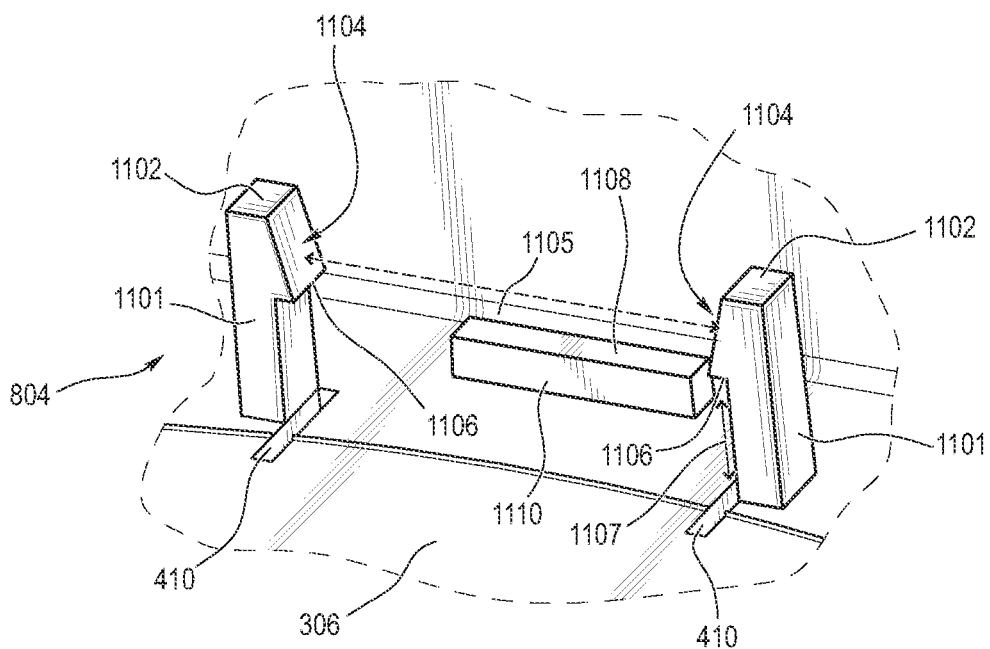
FIG. 11 illustrates a second end portion of a DIN rail clip-in in accordance with one or more embodiments of the present disclosure.

FIG. 11 illustrates the second end portion 804 in accordance with one or more embodiments of the present disclosure. As shown, the second end portion 804 comprises locking posts 1102. The locking posts 1102 include arms 1101 that extend upwardly (e.g., substantially perpendicularly) from the interior bottom surface 306. In certain embodiments, the locking posts 1102 are flexible. The locking posts 1102 further include a ramped surface 1104 positioned apart at an interference distance 1105. The interference distance 1105 can correspond to an interference fit for DIN rail shoulders. For example, the interference distance 1105 can range from 15 millimeters to 30 millimeters. In particular implementations, the interference distance 1105 is 25 millimeters (+/−2 millimeters). Additionally, the ramped surface 1104 includes an angled surface that extends to a locking edge 1106.

The locking edge 1106 defines a surface that juts outwardly from the arms 1101. In addition, the locking edge 1106 is positioned at a height 1107 that corresponds to a DIN rail height (as measured from the bottom surface to the top-most flange surface of a DIN rail). For example, the height 1107 ranges from 5 millimeters to 10 millimeters. In particular implementations, the height 1107 is 7.5 millimeters (+/−1 millimeter).

The second end portion 804 further includes a stop 1108. The stop 1108 comprises a block, riser, or protrusion extending above the interior bottom surface 306. In some embodiments, the stop 1108 comprises an engagement face 1110. In some embodiments, the engagement face 1110 is a flat face (e.g., for perpendicularly engaging or abutting a DIN rail).

Together, the locking posts 1102 and the stop 1108 can secure a second end of the DIN rail. For example, DIN rail shoulders can be rested on each ramped surface 1104 of the locking posts 1102. The DIN rail can then be pressed downward such that the DIN rail shoulders and flange slide down the ramped surface 1104 toward the interior bottom surface 306. As the DIN rail moves down the ramped surface 1104, the locking posts 1102 can flex or bias (e.g., move outwardly away from each other). With sufficient downward pressure on the DIN rail, the DIN rail flange can be locked into position underneath the locking edge 1106. In this locked position, the locking edge 1106 can prevent incidental upward movement of the DIN rail flange. Additionally, in this locked position, the locking posts 1102 have returned back to their unbiased position.

Further, in the locked position, the DIN rail can abut or be in close proximity to the engagement face 1110 of the stop 1108. In some embodiments, the engagement face 1110 abuts the DIN rail such that the other end of the DIN rail cannot incidentally withdraw from the end holder 1002 of the first end portion 802 (not shown).

Any of the features, components, and/or parts, including the arrangements and configurations thereof shown in FIGS. 10-11 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 10-11.

Figure 12:
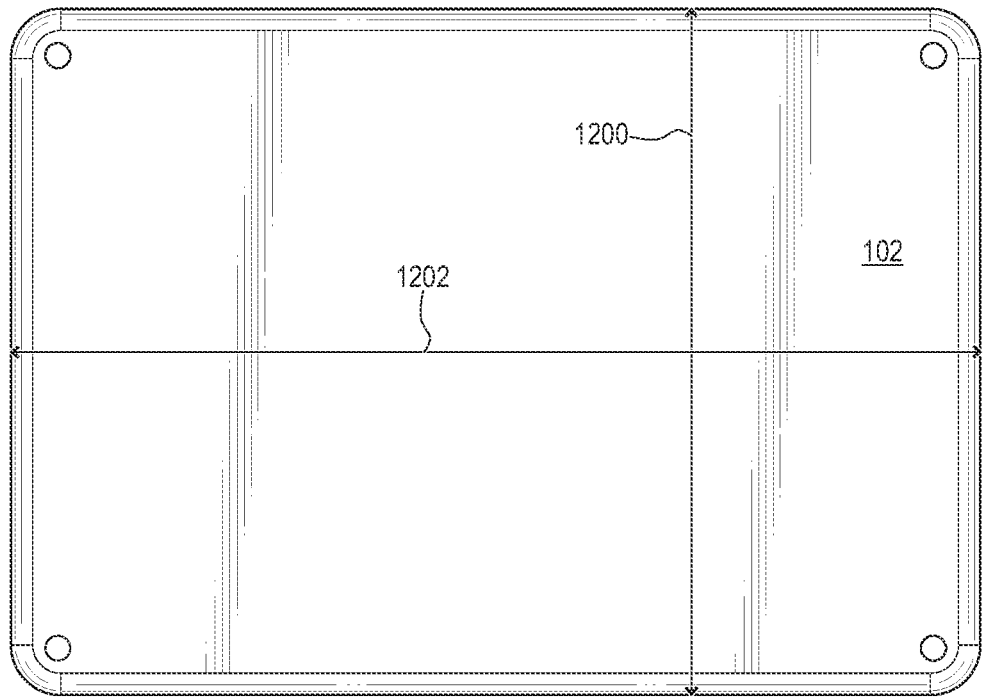
FIGS. 12-13 respectively illustrate top and bottom views of a junction box lid in accordance with one or more embodiments of the present disclosure.
Figure 13:
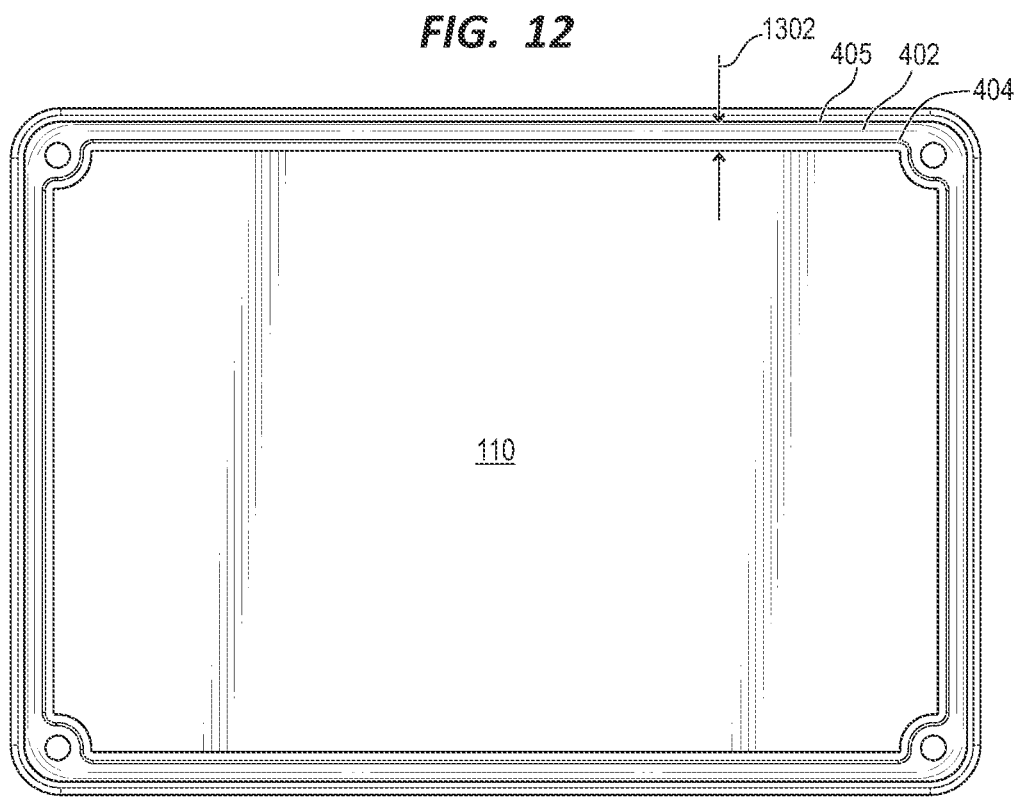

FIGS. 12-13 respectively illustrate top and bottom views of the lid 102 in accordance with one or more embodiments of the present disclosure. In particular, the lid 102 can have a variety of different shapes and/or cross-sectional profiles. For instance, in some embodiments, the lid 102 is triangular shaped, square shaped, pentagonal shaped, etc. As shown, however, the lid 102 comprises a rectangular shape (e.g., that coincides with a rectangular shape of the housing 104, not shown). Specifically, the lid 102 comprises a lid width 1200 and a lid length 1202. The lid width 1200 is less than the lid length 1202, thereby forming the rectangular shape of the lid 102.

In some examples, the lid width 1200 ranges from 3 inches to 15 inches. In particular implementations, the lid width 1200 is between 5 inches and 6 inches. Similarly, the lid length 1202 ranges from 4 inches to 20 inches. In particular embodiments, the lid length 1202 is between 7 inches and 10 inches. Of course, other sizes (e.g., larger sizes for different roof types or solar-install applications) can be implemented.

In FIG. 13, the gasket channel 402 is in plain view. The gasket channel 402 is defined by the gasket wall 404 (discussed above) and the flange 405 (which defines the curved portion of the lid 102 that is extendable around the housing 104). In particular, the gasket channel 402 comprises a channel width 1302 measured from the flange 405 to the gasket wall 404. The channel width 1302 can be sized to fit an O-ring, FIP gasket, CIP gasket, or other suitable seal.

Any of the features, components, and/or parts, including the arrangements and configurations thereof shown in FIGS. 12-13 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 12-13.

Figure 14:
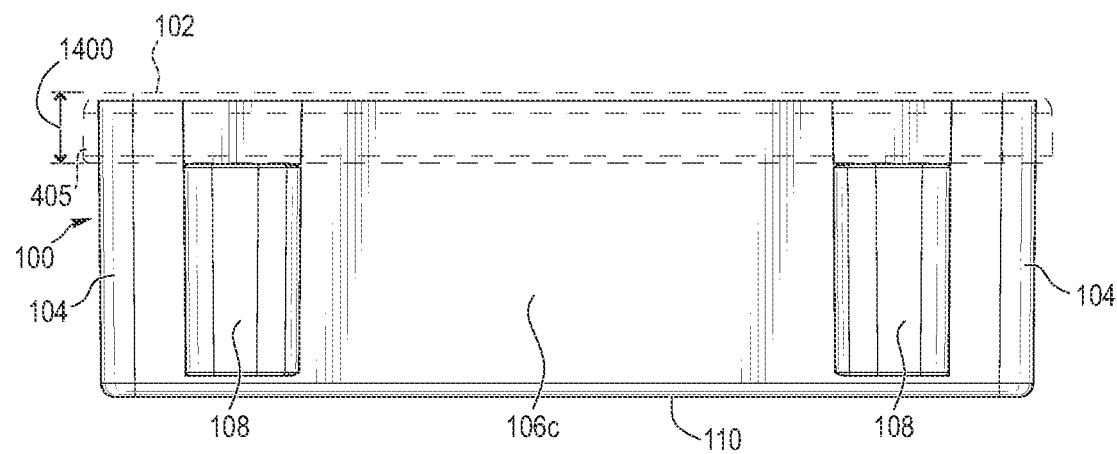
FIGS. 14-16 respectively illustrate a profile view, an opposing profile view, and a side profile view of a junction box in accordance with one or more embodiments of the present disclosure.
Figure 15:
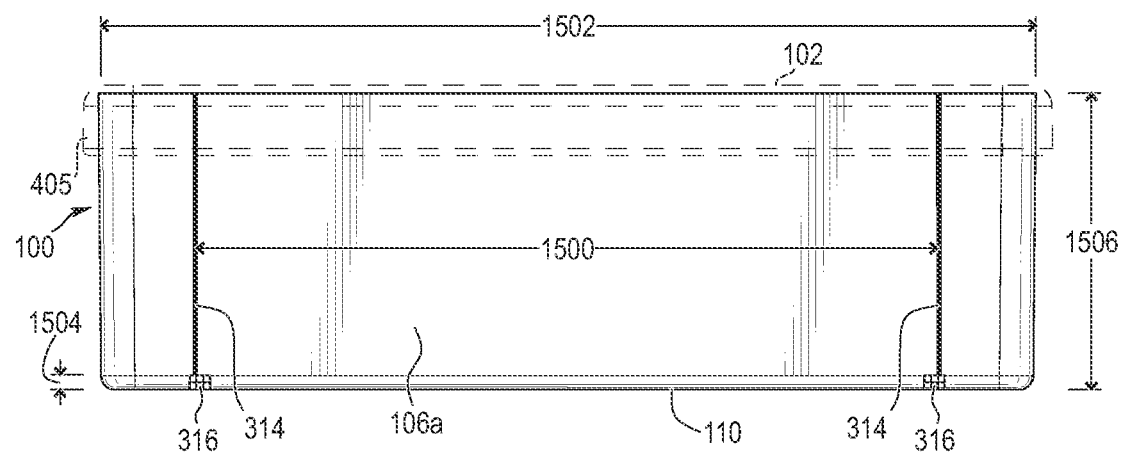
Figure 16:
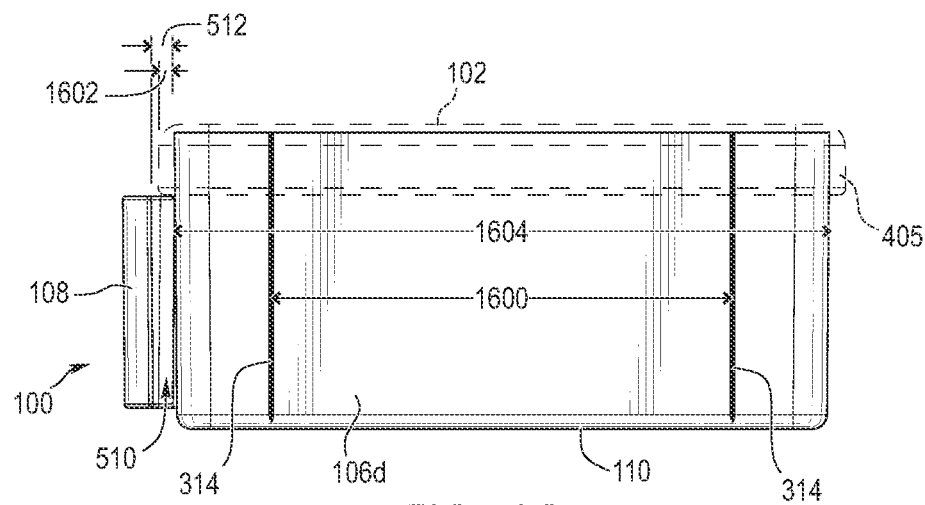

FIGS. 14-16 respectively illustrate a profile view, an opposing profile view, and a side profile view of the junction box 100 in accordance with one or more embodiments of the present disclosure. As shown, the lid 102 comprises a lid height 1400. The lid height 1400 can range from 0.25 inches to 4 inches. In particular embodiments, the lid height 1400 is between 0.5 inches and 1.5 inches. In some embodiments, the lid height 1400 is sized such that the lid 102 is positionable to abut or be within close proximity of a top portion of the mounting brackets 108 of the housing 104 (e.g., when the lid 102 is positioned over the housing 104).

In FIG. 15, the drilling boundary indicators 314 are shown on the housing 104. As described above, the drilling boundary indicators 314 comprise a visual or tactile indication where sidewall drilling through the housing 104 is permitted. In some embodiments, the drilling boundary indicators 314 are spaced apart by a distance 1500. Compared to a housing length 1502 (which ranges from 4 inches to 20 inches), the distance 1500 ranges from 50% to 95% of the housing length 1502. In particular implementations, the distance 1500 is between 70% and 85% of the housing length 1502. For instance, the distance 1500 is between 6 inches and 8 inches. Thus, a majority of the sidewall 106a comprises a drillable portion for access into the housing 104.

Further shown in FIG. 15, the weep holes 316 extend upward into the sidewall 106a. In some embodiments, the weep holes 316 comprise a weep hole height 1504 measured from the exterior bottom surface. In some embodiments, the weep hole height 1504 corresponds to the transition height where the sidewall 106a curves or transitions to the exterior bottom surface. Additionally or alternatively, the weep hole height 1504 is relative to a housing height 1506 of the housing 104. For example, in some embodiments, the weep hole height 1504 ranges from 2% to 15% of the housing height 1506. In these or other embodiments, the housing height 1506 is between 2 inches and 10 inches. By extending upwards along the sidewall 106a to the weep hole height 1504, condensation can be evacuated from inside the housing 104 notwithstanding the different possible orientations or angles of the junction box 100 (whether suspended over a roof structure or side-mounted on the side of a house).

The weep holes 316 can also be spaced apart according to a variety of distances. In particular embodiments, the weep holes 316 are spaced apart by the distance 1500, as with the drilling boundary indicators 314. In alternative embodiments, the weep holes 316 are interspaced at a different distance than the distance 1500.

In FIG. 16, the drilling boundary indicators 314 are shown on a different sidewall, namely the sidewall 106d. In this example, the drilling boundary indicators 314 are spaced apart by a distance 1600. The distance 1600, similar to the distance 1500, can be dependent on the dimensions of the sidewall 106d. For example, compared to a housing width 1604 (which ranges from 4 inches to 20 inches), the distance 1600 ranges from 50% to 95% of the housing width 1604. In particular implementations, the distance 1600 is between 70% and 85% of the housing width 1604. For instance, the distance 1600 is between 2 inches and 10 inches. Thus, a majority of the sidewall 106d (and likewise the opposing sidewall 106b, not shown) comprises a drillable portion for access into the housing 104.

As mentioned above, the lid 102 can be positioned adjacent to or abutting the mounting brackets 108. In so doing, the lid 102 can at least partially enclose a top end of the interior portion 510 of the mounting brackets 108. Specifically, FIG. 16 shows the flange 405 of the lid 102 comprises a thickness 1602. In certain implementations, the thickness 1602 of the lid 102 extends a portion of the clearance distance 512. For example, the thickness 1602 extends a majority of the clearance distance 512. In these or other embodiments, thickness 1602 of the lid 102 can help secure a rail mount (not shown) within the mounting brackets 108. For example, the lid 102 can wedge the rail mount against the mounting brackets 108 inside the interior portion 510.

Any of the features, components, and/or parts, including the arrangements and configurations thereof shown in FIGS. 14-16 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 14-16.

Figure 17:
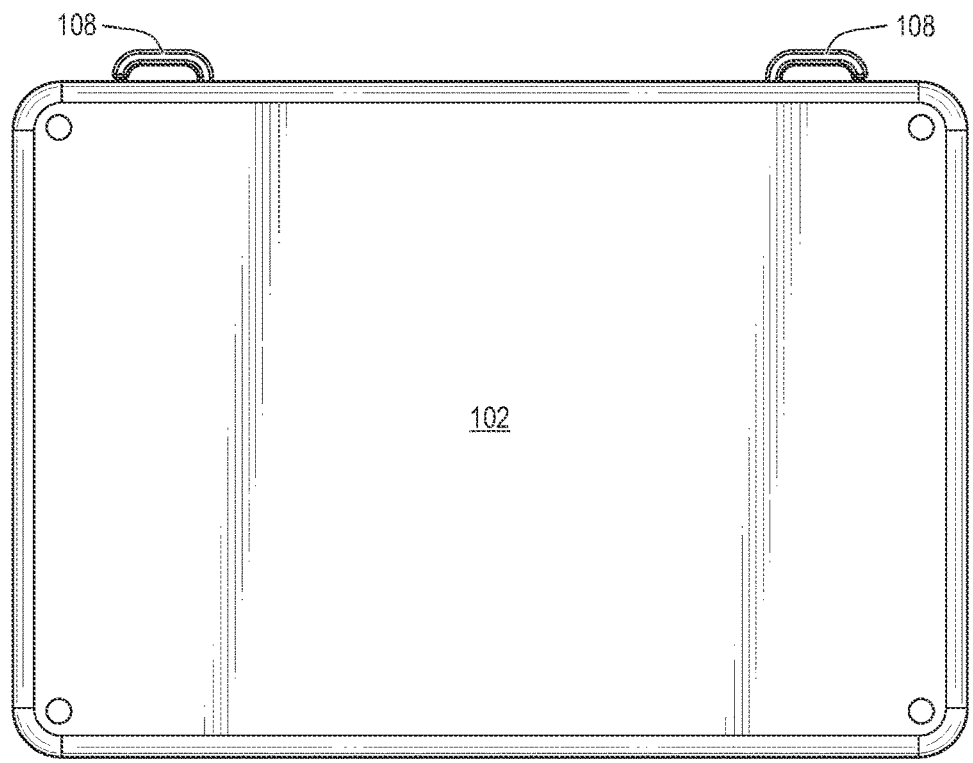
FIGS. 17-18 respectively illustrate a top profile view and a bottom profile view of a junction box in accordance with one or more embodiments of the present disclosure.
Figure 18:
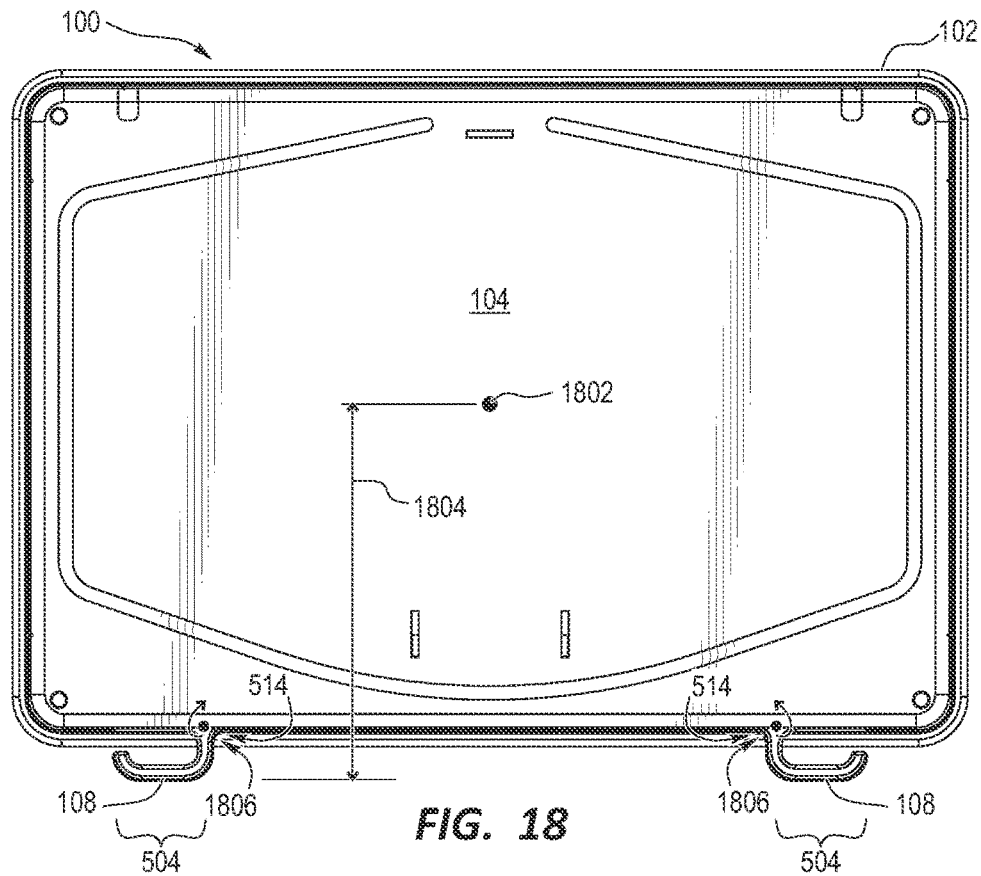
Figure 19:
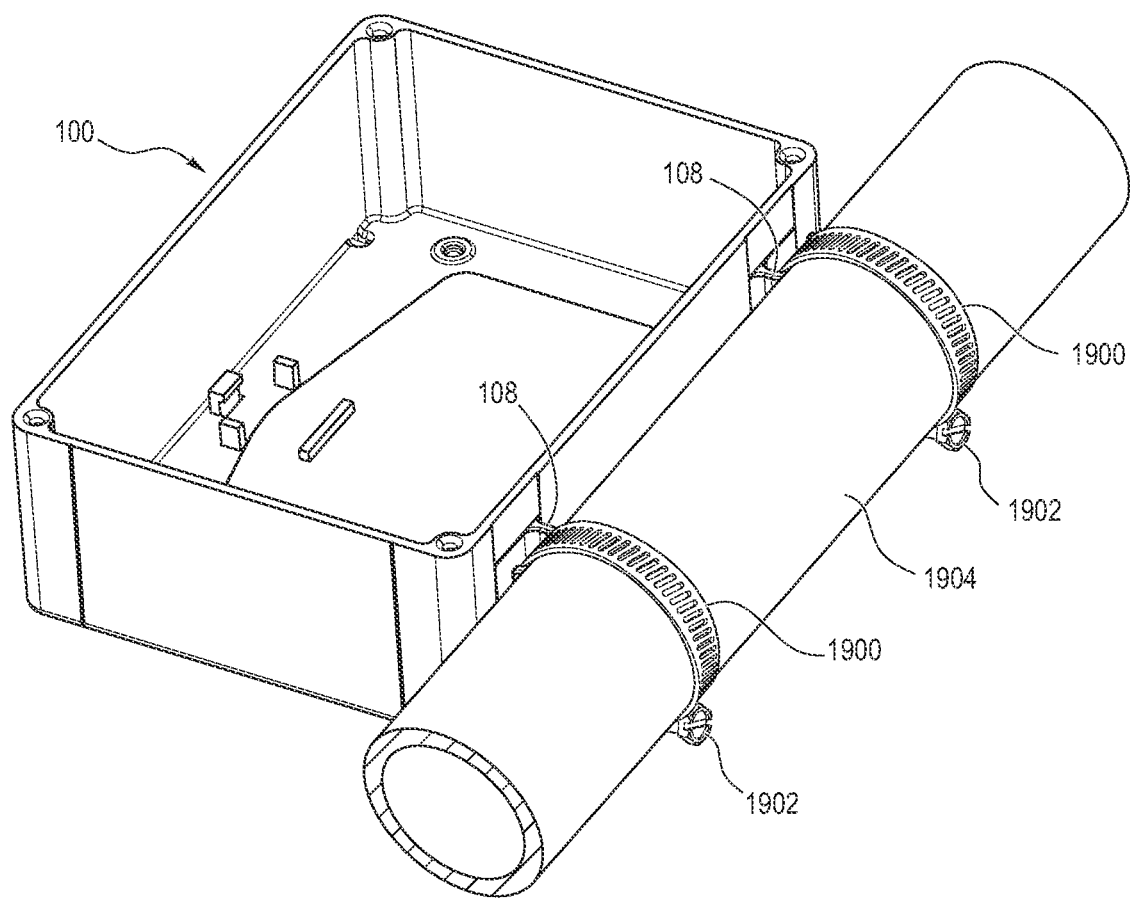
FIG. 19 illustrates a rail-mountable system including a junction box with a rail mount in accordance with one or more embodiments of the present disclosure.

FIGS. 17-18 respectively illustrate a top profile view and a bottom profile view of the junction box 100 in accordance with one or more embodiments of the present disclosure. As shown, the lid 102 is positioned over the housing 104. In this enclosed position, these figures also show the lid 102 protruding outwardly over the mounting brackets 108 (e.g., to partially cover a top side of the interior portion 510) as described above.

In addition, FIG. 18 shows the junction box 100 comprises a center of gravity 1802—a point where a downward force from the weight of the junction box 100 can be modeled as passing through (into and out of the page). The junction box 100 further comprises a moment arm 1804 measured from the center of gravity 1802 to the mounting brackets 108 (namely the outermost portion of the mounting brackets 108, the exterior surface of the second bracket wall 504).

A combination of the moment arm 1804 and the junction box weight through the center of gravity 1802 define a bending moment 1806. In particular, the bending moment 1806 is equivalent to the junction box weight multiplied by the moment arm 1804. In these or other embodiments, the bending moment 1806 (or a portion thereof) acts through the point of connection between the mounting brackets 108 and the sidewall 106c (i.e., the reinforced connection 514). For example, one half of the bending moment 1806 acts through the reinforced connection 514 for a first mounting bracket, and the other half of the bending moment 1806 acts through the reinforced connection 514 for the other mounting bracket.

In at least some implementations, the bending moment 1806 comprises a reduced bending moment compared to the bending moments of conventional junction boxes that are configured for rail mounting. To illustrate, some contributing factors are as follows. For example, the junction box 100 is composed of a lightweight, durable material that weighs less than other conventional junction boxes. Additionally, the junction box 100 can be rectangular shaped, thereby reducing the moment arm 1804 by positioning the center of gravity 1802 closer to the point of contact between the mounting brackets 108 and a solar array rail structure. Similarly, the mounting brackets 108 can be low profile (e.g., not overextending beyond the mounting sidewall), which also contributes to a smaller moment arm 1804. These and other contributing factors can reduce the bending moment 1806 compared to conventional junction boxes. In at least some embodiments, this improvement can correspondingly improve the durability and lifetime of the junction box 100 compared to conventional junction boxes.

Any of the features, components, and/or parts, including the arrangements and configurations thereof shown in FIGS. 17-18 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 17-18.

As mentioned above, the junction box 100 can include a rail mount. FIGS. 19 and 20A-20D illustrate a rail-mountable system comprising the junction box 100 with a rail mount 1900 in accordance with one or more embodiments of the present disclosure. As shown, the rail mount 1900 comprises an adjustable clamp (or clamp) with an adjustment mechanism adjustment mechanism 1902. Alternatively to a clamp, the rail mount 1900 can include zip ties, Velcro® strips, bailing wire, rope, string, or tape.

The junction box 100 can include multiple rail mounts 1900 (e.g., at least two rail mounts, as shown). In other embodiments, the junction box 100 includes only a single rail mount 1900.

Each rail mount 1900 can be positioned inside the mounting brackets 108 for securing the junction box 100 to a solar array rail structure 1904. To illustrate, the rail mount 1900 can tighten or loosen in response to actuation (e.g., twisting or screwing) of the adjustment mechanism 1902. Specifically, actuation of the adjustment mechanism 1902 can drive a worm gear in the adjustment mechanism 1902 to engage slots or teeth defined in the band of the rail mount 1900—thereby translating the rail mount 1900 to form a larger or smaller diameter. In some embodiments, the number of slots or teeth defined in the band of the rail mount 1900 can define an adjustment range for the rail mount 1900. In certain examples, more slots or teeth in the rail mount 1900 can be added to extend the adjustment range and/or the adjustment resolution of the rail mount 1900. With sufficient tightening of the adjustment mechanism 1902, the rail mount 1900 can bind the mounting brackets 108 to the solar array rail structure 1904 such that the mounting brackets 108 abuts the solar array rail structure 1904.

In these or other embodiments, the solar array rail structure 1904 corresponds to one or more members for supporting and mounting a solar array (e.g., solar panels) to a roof or wall structure. Those of ordinary skill in the art will appreciate that the solar array rail structure 1904 can be formed with a variety of sizes, materials, thickness (or gauge), etc. Indeed, the solar array rail structure 1904 can be circular shaped, oval shaped, rectangular shaped, square shaped, or shaped with another polygonal profile. Similarly, the solar array rail structure 1904 can include a variety of different cross-sectional profiles having a variety of sizes, materials, extrusions, surface recesses, hollow regions, etc.

Unfortunately, conventional junction boxes are only compatible with a specific model or type of rail structure. For example, some conventional junction boxes include mounting features that engage corresponding mounting features on the rail structure. By contrast, the rail mount 1900 and the mounting brackets 108 can universally fit a host of different rail structures, regardless of size, material, available mounting features, etc. Specifically, the rail mount 1900 and the mounting brackets 108 can mount to these and/or other rail structures known to those of ordinary skill in the art. Advantageously, the universal fit afforded by the rail mount 1900 and the mounting brackets 108 provides significant compatibility improvements over conventional junction boxes. Accordingly, the junction box 100 is mountable with the myriad different rail structures.

FIGS. 20A-20D illustrate an example process of attaching a junction box 100 to the solar array rail structure 1904 via the rail mount 1900 in accordance with one or more embodiments. In a first set of steps, the rail mount 1900 can be inserted into the mounting brackets 108 and positioned around the solar array rail structure 1904. A particular order of inserting the rail mount 1900 into the mounting brackets 108 versus positioning around the solar array rail structure 1904 is not required. For example, at least one rail mount 1900 is positioned around the solar array rail structure 1904 prior to inserting the rail mount 1900 into the mounting brackets 108. In other embodiments, however, at least one rail mount 1900 is not positioned around the solar array rail structure 1904 prior to inserting the rail mount 1900 into the mounting brackets 108.

Such flexibility in mounting steps can provide increased convenience for technicians (e.g., installers or repair personnel). To illustrate, the junction box 100 can be mounted to the solar array rail structure 1904 at an end portion (allowing at least one of the rail mount 1900 to be slid onto the solar array rail structure 1904 post-insertion into the mounting brackets 108). In other examples, the junction box 100 is mounted to the solar array rail structure 1904 at non-end portions. In such a case, the rail mount 1900 can be unthreaded and opened to first mount to the solar array rail structure 1904 prior to insertion into the mounting brackets 108.

Figure 20A:
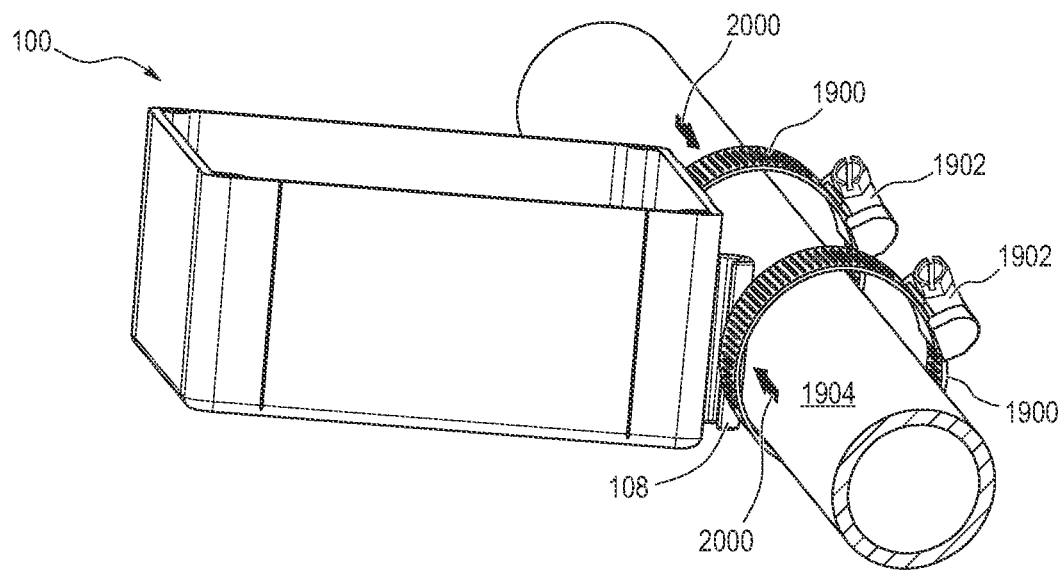
FIGS. 20A-20D illustrate an example process of attaching a junction box to a solar array rail structure via the rail mount in accordance with one or more embodiments of the present disclosure.

Moreover, as shown in FIG. 20A, each rail mount 1900 is positioned toward the mounting brackets 108 (e.g., in the direction of arrows 2000). However, as depicted, the curvature of the rail mount 1900 can interfere or otherwise inhibit insertion of the rail mount 1900 into the mounting brackets 108.

Figure 20B:
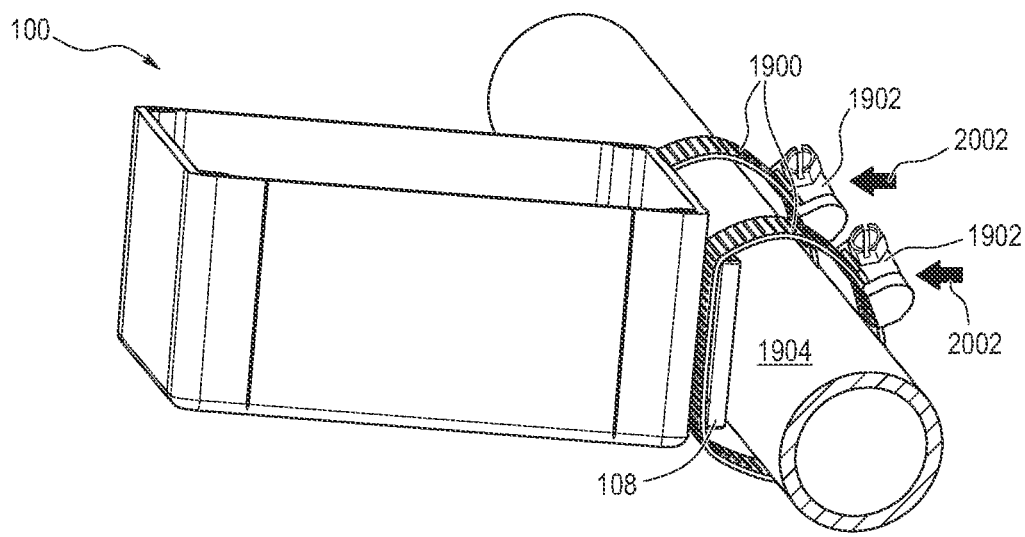

FIG. 20B shows the process to insert the rail mount 1900 into the mounting brackets 108. For example, the rail mount 1900 is compressed against the junction box 100 (e.g., in the direction of the arrows 2002). By compressing the rail mount 1900 in this manner, the curvature of the rail mount 1900 becomes compatible with inserting into the mounting brackets 108 (e.g., by slipping through the clearance distance 512 past the retaining edge 506 of the mounting brackets 108).

Figure 20C:
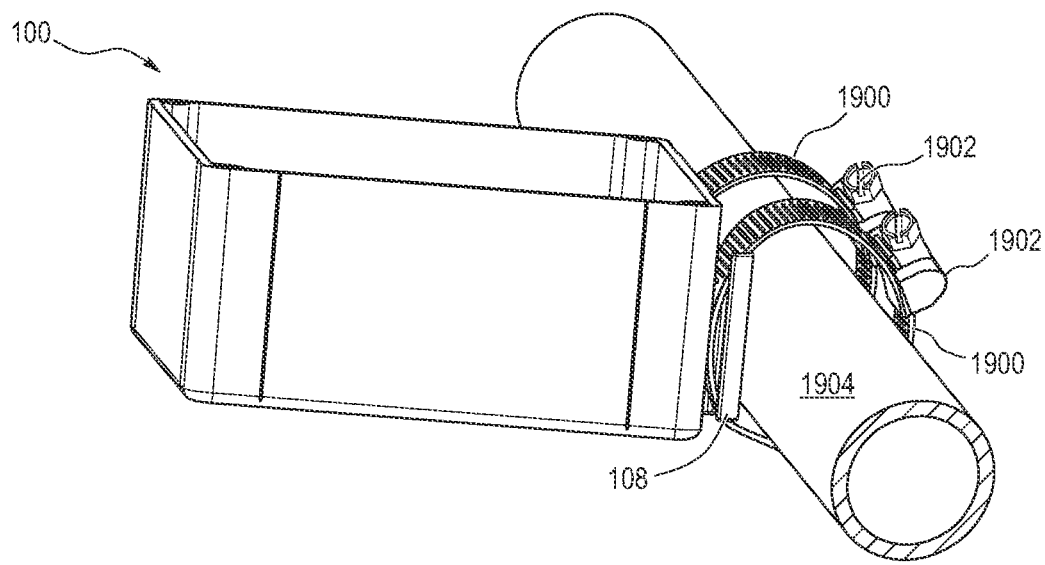

In FIG. 20C, the rail mount 1900 rebounds within the mounting brackets 108 after the compressive forces are released. Once rebounded, the rail mount 1900 in its non-compressed state is wedged between the mounting sidewall of the junction box 100 and the mounting brackets 108. In particular, the curvature of the rail mount 1900 (when non-compressed) inhibits incidental withdrawal of the rail mount 1900 from the mounting brackets 108. Thus, a technician can freely move around or adjust the junction box 100 with the rail mount 1900, but without fear of the rail mount 1900 falling out.

Figure 20D:
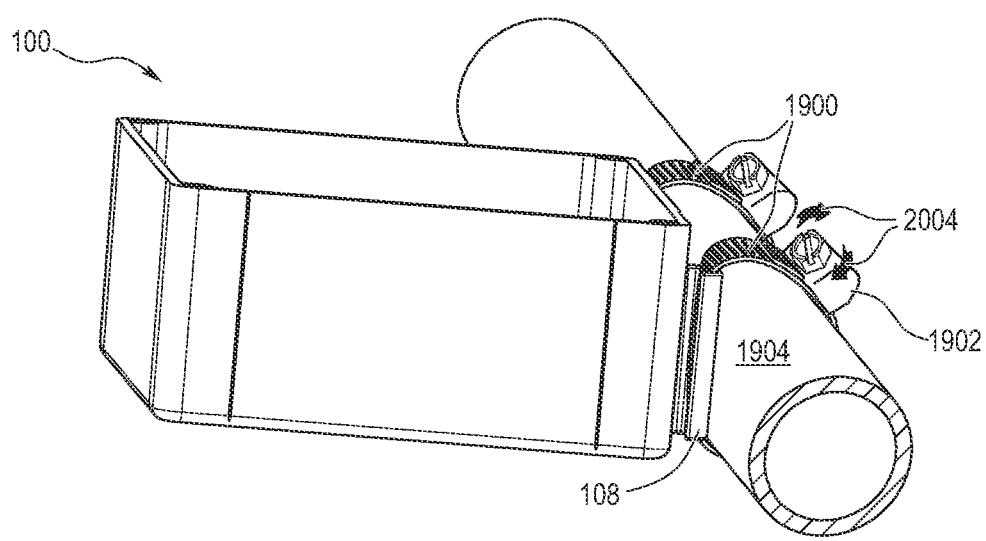

In FIG. 20D, the adjustment mechanism 1902 is actuated to fasten the junction box 100 to the solar array rail structure 1904. In particular, a screw or bolt of the adjustment mechanism 1902 is turned clockwise in the direction of arrows 2004. In so doing, the rail mount 1900 reduces its diameter. In some cases, the rail mount 1900 at least partially conforms to the mounting brackets 108 and/or the solar array rail structure 1904. In turn, the rail mount 1900 draws the mounting brackets 108 (and therefore the junction box 100) into intimate contact with the solar array rail structure 1904. In this fastened position, the junction box 100 is securely mounted to the solar array rail structure 1904.

Any of the features, components, and/or parts, including the arrangements and configurations thereof shown in FIGS. 19 and 20A-20D can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 19 and 20A-20D.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed.

It will be apparent to one of ordinary skill in the art that many modifications and variations are possible in view of the above teachings. Indeed, various inventions have been described herein with reference to certain specific aspects and examples. However, they will be recognized by those skilled in the art that many variations are possible without departing from the scope and spirit of the inventions disclosed herein. Specifically, those inventions set forth in the claims below are intended to cover all variations and modifications of the inventions disclosed without departing from the spirit of the inventions. The terms "including" or "includes" as well as "having" or "have" as used in the specification and claims shall have the same meaning as the term "comprising." Further, the term "substantially" or "about" should be interpreted as +/−10% of a given value. For example, substantially perpendicular is equivalent to 90 degrees+/−9 degrees (which is 10% of 90 degrees) relative to a reference datum.

What is claimed is:

1. A junction box, comprising:
   a housing, including:
      a bottom surface; and
      sidewalls extending upward from a periphery of the bottom surface, one of the sidewalls comprising a mounting sidewall to mount to a solar array rail structure;
   a lid positionable on the housing; and
   a first and a second mounting bracket, each of the first and second mounting brackets comprising:
      a first bracket wall connected to the mounting sidewall, the first bracket wall extending perpendicularly to the mounting sidewall and oriented in a vertical direction, the vertical direction perpendicular to the bottom surface; and
      a second bracket wall connected to the first bracket wall and terminating in a retaining edge, the retaining edge comprising a curved portion oriented toward the mounting sidewall, the second bracket wall extending parallel to the mounting sidewall, the first and second bracket walls forming a c-shaped mounting bracket defining an interior channel extending in the vertical direction, the retaining edge spaced apart from the mounting sidewall providing an opening to the interior channel, wherein a length of the interior channel in the vertical direction exceeds a width of a cross section of the interior channel in a plane parallel to the bottom surface,
   wherein the first and second mounting brackets are separate and spaced apart along the mounting sidewall in a horizontal direction perpendicular to the vertical direction.

2. The junction box of claim 1, wherein the first bracket wall is oriented in the vertical direction.

3. The junction box of claim 1, wherein:
   the opening between the retaining edge and the mounting sidewall of the first and second mounting brackets is sized and shaped to receive a rail mount; and
   the opening defines a clearance distance for access into and out of the interior channel.

4. The junction box of claim 1, wherein:
   the housing and the lid comprise a junction box weight at a center of gravity; and
   the junction box weight multiplied by a distance between the center of gravity and the second bracket wall defines a bending moment for each of the first and second mounting brackets at the mounting sidewall.

5. The junction box of claim 1, wherein each of the first and second mounting brackets is a unibody bracket, the first bracket wall and the second bracket wall being inseparably connected.

6. The junction box of claim 1, wherein each of the first and second mounting brackets comprises a reinforced connection between the mounting sidewall and the first bracket wall, the reinforced connection comprising at least one of increased material thickness or a fillet.

7. The junction box of claim 1, wherein the length of the interior channel in the vertical direction is at least three times the width of the cross section of the interior channel.

8. The junction box of claim 1, wherein the opening between the retaining edge and the mounting sidewall of the first mounting bracket is oriented to face away from the second mounting bracket and the opening between the retaining edge and the mounting sidewall of the second mounting bracket is oriented to face away from the first mounting bracket.

9. A junction box, comprising:
an interior bottom surface;
sidewalls extending upward from a periphery of the interior bottom surface, one of the sidewalls having an exterior mounting surface;
a lid positionable on the sidewalls; and
a first and a second mounting bracket inseparably connected to the exterior mounting surface, the first and second mounting brackets to mount to a solar array rail structure, each of the first and second mounting brackets comprising:
 a first bracket wall connected to the exterior mounting surface, the first bracket wall extending perpendicular to the exterior mounting surface and oriented in a vertical direction, the vertical direction perpendicular to the interior bottom surface; and
 a second bracket wall connected to the first bracket wall and terminating in a retaining edge, the retaining edge comprising a curved section shaped to curve from the second bracket wall in a direction oriented toward the exterior mounting surface the second bracket wall extending parallel to the exterior mounting surface, the first and second bracket walls forming a c-shaped mounting bracket defining an interior channel extending in the vertical direction, the retaining edge spaced apart from the exterior mounting surface providing an opening to the interior channel, wherein a length of the interior channel in the vertical direction exceeds a width of a cross section of the interior channel in a plane parallel to the interior bottom surface,
 wherein the first and second mounting brackets are separate and spaced apart along the exterior mounting surface in a horizontal direction perpendicular to the vertical direction.

10. The junction box of claim 9, further comprising a DIN rail clip-in structure positioned on the interior bottom surface.

11. The junction box of claim 9, wherein the interior bottom surface and the sidewalls form a rectangular-shaped housing.

12. The junction box of claim 9, wherein the sidewalls comprise a pair of drilling boundary indicators.

13. The junction box of claim 9, further comprising a weep hole positioned within the interior bottom surface and extending through at least a portion of one of the sidewalls.

14. The junction box of claim 9, further comprising:
an exterior bottom surface opposing the interior bottom surface;
a drill zone in the interior bottom surface; and
a seal groove in the exterior bottom surface, wherein the drill zone corresponds to the seal groove.

15. The junction box of claim 9, wherein the length of the interior channel in the vertical direction is at least three times the width of the cross section of the interior channel.

16. The junction box of claim 9, wherein the opening between the retaining edge and the exterior mounting surface of the first mounting bracket is oriented to face away from the second mounting bracket and the opening between the retaining edge and the exterior mounting surface of the second mounting bracket is oriented to face away from the first mounting bracket.

17. A rail-mountable system comprising:
a housing comprising:
 an interior bottom surface;
 sidewalls extending upward from a periphery of the interior bottom surface, one of the sidewalls comprising an exterior mounting surface; and
a first and second mounting bracket inseparably connected to the exterior mounting surface, each of the first and second mounting brackets comprising:
 a first bracket wall connected to the exterior mounting surface, the first bracket wall extending perpendicular to the exterior mounting surface and oriented in a vertical direction, the vertical direction perpendicular to the interior bottom surface; and
 a second bracket wall connected to the first bracket wall and terminating in a retaining edge, the retaining edge comprising a curved portion oriented toward the exterior mounting surface, the second bracket wall extending parallel to the exterior mounting surface, the first and second bracket walls forming a c-shaped mounting bracket defining an interior channel extending in the vertical direction, the retaining edge spaced apart from the exterior mounting surface providing an opening to the interior channel, wherein a length of the interior channel in the vertical direction exceeds a width of a cross section of the interior channel in a plane parallel to the bottom surface,
 wherein the first and second mounting brackets are separate and spaced apart along the mounting sidewall in a horizontal direction perpendicular to the vertical direction,
a lid positionable on the sidewalls; and
a rail mount attachable to at least one of the first and second mounting brackets, the rail mount to mount to a solar array rail structure.

18. The rail-mountable system of claim 17, wherein the rail mount comprises an adjustable clamp.

* * * * *